(12) United States Patent
Kato et al.

(10) Patent No.: US 6,335,601 B1
(45) Date of Patent: Jan. 1, 2002

(54) WIPER CONTROL DEVICE

(75) Inventors: Masaru Kato; Yasuki Matsumoto; Haruo Yamazaki, all of Yokohama (JP)

(73) Assignee: Jidosha Denki Kogyo Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/615,698

(22) Filed: Jul. 13, 2000

(30) Foreign Application Priority Data

Jul. 13, 1999 (JP) .......................................... 11-199229
Jul. 13, 1999 (JP) .......................................... 11-199257

(51) Int. Cl.$^7$ ................................................ H02P 1/04
(52) U.S. Cl. ..................... 318/444; 318/65; 318/256; 318/280; 318/282; 318/443
(58) Field of Search ................................. 318/9–11, 14, 318/65–69, 739–740, 256–257, 280–283, 286, 443–444, 466–467, DIG. 2

(56) References Cited

U.S. PATENT DOCUMENTS

| | | | |
|---|---|---|---|
| 3,887,855 A | * 6/1975 | Klimo | ......................... 318/332 |
| 4,227,138 A | * 10/1980 | Espelage et al. | ............ 318/802 |
| 4,405,887 A | * 9/1983 | Tamura et al. | .............. 318/443 |
| 6,249,098 B1 | * 6/2001 | Miyazaki et al. | ........... 318/280 |

* cited by examiner

Primary Examiner—Marlon T. Fletcher
(74) Attorney, Agent, or Firm—Sughrue Mion, PLLC

(57) ABSTRACT

A wiper control device suitable used for controlling the wiper apparatus possible to solve a difference in the wiping range caused by the difference in the operation speed (inertial force) of the wiper blade by using the wiper linkage provided with an eccentric mechanism and changing the rotational direction of a wiper motor according to the operation speed, the wiper control device is provided with a wiper switch, the wiper motor, a position switch, a controller and a motor driving circuit, and the controller executes control to change the rotational direction of the wiper motor at the time when the wiper blade arrives in the upper or lower turning position in response to switching operation of the wiper mode.

14 Claims, 13 Drawing Sheets

WIPER CONTROL DEVICE

BACKGROUND OF THE INVENTION

1. Field of the Invention

This invention relates to a wiper control device for actuating a wiper device mounted, for example on a motor vehicle and especially to a device for controlling the wiper device which is so designed as to change the rotational direction of the wiper motor between cases of high-speed operation and low-speed operation of the motor and decrease substantial length of a motor arm of the wiper linkage at the time of the high speed operation as compared with that of the motor arm at the time of the low speed operation through an arm-length adjusting device including an eccentric mechanism attached on the motor arm of the linkage in order to solve a difference in the wiping ranges at the time of high speed operation and low speed operation caused by a difference of inertial force of the wiper blade.

2. Description of the Prior Art

As an apparatus for wiping rain drops adhering to the windshield of the motor vehicle and ensuring the wide visual range of a driver, wiper apparatuses having various structure and function have been used. Recently, a wiper apparatus which is designed so as to be possible to select working speed of the wiper blade between continuous operation of two-level at high and low speeds and intermittent operation at a low speed according to the amount of rain-fall is used generally.

In the wiper apparatus of this kind, kinetic energy of the wiper blade at he time of high speed operation (high-speed mode) becomes larger than that of the wiper blade at the time of low speed operation (low-speed mode), therefore a phenomenon is observed in that the wiping range of the wiper blade at the time of high-speed operation becomes wider as compared with the wiping range at the time of low-speed operation of the wiper blade according to the difference in the inertial force of the wiper blade. Accordingly, there is defectiveness in that the windshield partially remains unwiped and the visual field becomes narrow at the time of low speed operation in a case where the wiping range of the windshield is set on basis of the oscillation range of the wiper blade at the time of high speed operation and the wiper blade runs out of the windshield glass at the time of high speed operation in a case where the wiping range of the windshield is set on basis of the oscillation range of the wiper blade at the time of high speed operation.

Applicant proposed previously a wiper linkage which was so designed as to solve the difference in the actual wiping range enlarged owing to addition of the inertial force of the wiper blade by setting the rotational direction of the wiper motor at the time of high speed operation conversely against that of the wiper motor at the time of low speed operation, making the substantial length of the motor arm of the wiper linkage at the time of high speed operation shorter than that of the motor arm at the time of low speed operation through an arm length adjusting mechanism attached to the motor arm and used with an eccentric bush to be turned as much as 180° at the time of switching over the rotational direction of the motor arm and reducing the structural wiping range of the wiper blade at the time of high speed operation as compared with that of the wiper blade at the time of low speed operation in Japanese Patent Application No.10-158026/98 in order to remove the difference in the wiping range caused by the difference in the operation speed of the wiper blade in the conventional wiper apparatus of the two-speed type.

In the newly proposed wiper linkage as mentioned above, however, it is different foundamentally from the conventional wiper linkage in the point that the rotational directions of the wiper motor at the high speed operation and the low speed operation are different from each other, so that there are various problems differing from the conventional linkage in switching control of the wiper mode (high-speed mode and low-speed mode), auto-stop control at the time of stopping the wiper apparatus and so on. For example, it becomes necessary to supply an electric current by changing the brush terminals of the wiper motor at the same time of changing the direction of the electric current in a case the wiper mode is changed over from the low-speed mode into the high-speed mode or from the high-speed mode into the low-speed mode, and the wiper blade goes back at the middle of the wiping range on the windshield glass, whereby not only a strange impression is given to the passengers, but also an unwiped area remains on the windshield glass until the wiper blade comes back from the turning position in a case where the rotational direction of the wiper motor is changed regardless of the position of the wiper blade. So that there is a problem in that it is necessary to perform special control differing from the conventional wiper linkage, and development of the wiper control device has become on subject, which is suitable for the wiper linkage so designed as to remove the difference in the wiping range caused by the difference in the operation speed of the wiper blade by changing the rotational direction of the wiper motor between the low speed operation and the high speed operation.

SUMMARY OF THE INVENTION

This invention is made in view of the aforementioned problem in the control of the wiper linkage of which wiper motor is different in the rotational direction between low speed operation and high speed operation, and it is an object to provide a wiper control device which is possible to smoothly switch over the rotational direction of the wiper motor together with the rotational speed and execute the control without causing the strange impression and the unwiped area at the time of changing the operation speed and stopping the wiper blade.

In order to accomplish to the aforementioned object, the wiper control device according to this invention is provided with a wiper switch, a wiper motor, a position switch, a controller and a motor driving circuit, and the controller is so designed as to change the rotational direction of the wiper motor at the time when the wiper blade arrives in the lower turning position or the upper turning position after the low-speed command signal or the high-speed command signal generated from the wiper switch is switched over into the high-speed command signal or the low-speed command signal, respectively. Namely, in the case where the wiper switch is switched over from the low-speed mode to the high-speed mode, or from the high-speed mode to the low speed mode, the rotation of the wiper motor is switched over from the low-speed forward rotation to the high-speed reverse rotation, or from the high-speed reverse rotation to the low-speed forward direction when the wiper blade arrives at either the lower turning position or the upper turning position, that is when the wiper linkage is in the dead point, therefore the unnatural phenomenon is solved in that the wiper blade goes back at the middle of the windshield glass according as the rotational direction of the wiper motor is changed.

In the wiper control device according to a preferred embodiment of this invention, the position switch is provided with a high-potential plate connected with the power source, a low-potential plate grounded, a clutch member rotatable by being pushed against a push member rotating together with the output shaft of the wiper motor only in a direction energized by the push member, and a movable contact attached to the clutch member so as to slidingly come in contact with the high and low-potential plates. Namely, the movable contact is not secured to the output shaft of the wiper motor and the wiper blade and so structured as to stay in the present position while the output shaft of the wiper motor makes nearly one revolution in a case where the wiper blade moves backward, or the rotational direction of the wiper motor is changed. Accordingly, the chattering of the wiper blade caused by obstacles such snows, and the signal change is obtained suitably for reversing control of the wiper motor from the movable contact by setting the openings between the high and low-potential plates in correspondence to the upper and lower turning positions of the wiper blade, respectively.

In the wiper control device according to another preferred embodiment of this invention, the motor driving circuit forms a current supplying circuit through the movable contact and the low-potential plate of the position switch when the controller does not generate neither the low-speed driving signal nor the high-speed driving signal, and the wiper motor is supplied with an electric current in the low-speed forward-rotational direction through the current supplying circuit while the movable contact is in contact with the low-potential plate of the position switch. Therefore, the wiper blade stops automatically in the predetermined position in response to disappearance of the low-speed driving signal and the high-speed driving signal after off-operation of the wiper switch.

In the wiper control device according to the other preferred embodiment of this invention, the position switch is set so as to produce a change in the position signal at the time when the wiper blade arrives at a position predetermined in just before the lower turning position, therefore improper behavior is solved in that the wiper blade stops after passing the lower turning position (home position) by inertia, or moves backward on the windshield glass by the inverting rotation of the wiper motor after passing through the lower turning position. In the wiper control device according to the other preferred embodiment of which position switch is set so as to produce a change in the position signal at the time the wiper blade arrives in a position predetermined in just before the upper turning position in a case where the wiper motor is rotated forwardly in the low speed, the changeover of wiper mode from the low-speed mode to the high-speed mode is carried out speedily by switching over the rotation of the wiper motor into the high-speed reverse rotation from the low-speed forward rotation at the time when the wiper blade is in the upper turning position.

Further in the wiper control device according to the other embodiment of this invention, the device is further provided with a circuit for supplying the position signal on low level to the controller when the movable contact arrives in an opening formed between the high and low-potential plates of the position switch in a case where the controller outputs the high-speed driving signal, and supplying the position signal on high level to the controller when the movable contact arrives in the opening formed between the high and low-potential plates in a case where the controller does not output the high-speed driving signal. Therefore, the controller recognizes the opening to be the high-potential plate at the time of low speed operation and recognizes the opening to be the low-potential plate at the time of high speed operation, and the change is caused in the position signal at the time when the wiper blade arrives at the position predetermined in just before the turning position regardless of the operation speed or the rotational direction of the wiper motor, so that the wiper blade turns accurately at the turning position and stops accurately at the lower turning position without passing the turning position by inertia.

In the wiper control device according to the other preferred embodiment of this invention, the controller is so designed as to interrupt the output of the high-speed driving signal at the time when the wiper blade arrives at a position predetermined in just before the lower turning position after disappearance of the high-speed command signal from the wiper switch. Accordingly, time required for the wiper blade to be stopped automatically in the home position (lower turning position) after off-operation of the wiper switch is reduced since the wiper mode remains in the high-speed mode until the wiper motor begins to rotate in the forward direction at the low speed through the current supplying circuit after arrival of the wiper blade in the lower turning position.

In the wiper control device according to the other desirable embodiment of this invention, the controller switches over the low-speed driving signal into the high-speed driving signal at the time when the wiper blade arrives at a predetermined position just before the lower turning position or the upper turning position after the low-speed command signal from the wiper switch is changed into the high-speed command signal, and the controller interrupts the output of the high-speed driving signal at the time when the wiper blade arrives at the predetermined position just before the lower turning position after the high-speed command signal from the wiper switch is changed into the low-speed command signal and generates the low-speed driving signal at the time when a period of time predetermined sufficiently longer than time required for the movable contact to pass the opening formed between the high and low-potential plates of the position switch elapses after the arrival of the wiper blade at the predetermined position just before the lower turning position. Therefore, in the case where the low-speed mode is switched over to the high-speed mode, the wiper mode is speedily switched because the driving signal is changed not only when the wiper blade arrives in the position just before the lower turning position, but also when it arrives in the position just before the upper turning position. Furthermore, in the case where the high-speed mode is switched over to the low-speed mode, the high-speed driving signal is interrupted first when the wiper blade arrives in the position just before the lower turning position, and then the low-speed driving signal is supplied after the movable contact passes completely through the opening existing between the high and low-potential plates of the position switch, therefore a large electric current does not flow in the relays even when the rotational direction of the wiper motor is changed, whereby load of the relays is lightened and reliability of the relays is improved.

In the wiper control device according to the other preferred embodiment of this invention, which is provide with a backup circuit, the backup circuit is so designed as to supply an electric current to the wiper motor in the low-speed forward-rotational direction or the high-speed reverse-rotational direction through the motor driving circuit in accordance with operation of the wiper switch at the time when a watchdog signal becomes extinct by failure of the controller. Therefore it is possible to relieve the serious situation in that the wiper blade falls completely to a standstill even if the controller breaks down unexpectedly owing to some reason.

Furthermore, in the wiper control device according to the other embodiment of this invention, the wiper motor is provided with a first terminal connected to a common brush, a second terminal connected to a low brush and a third terminal connected to a high brush, and the motor driving circuit is provided with four relays, first and second transistors of which emitters are grounded and bases are connected to a high-speed driving signal output port and a low-speed driving signal output port of the controller, respectively; ends of respective relay coils of the four relays are connected with the power source, the other ends of the respective relay coils of the first, second and third relays among the four relays are connected to the collector of the first transistor, another end of the relay coil of the fourth relay of the four relays is connected to the collector of the second transistor; a moving contact and a normal-closed contact of the first relay are connected to the power source and the second terminal of the wiper motor, respectively; a moving contact of the second relay is grounded and a normal-closed contact of the second relay is connected to the third terminal of the wiper motor; a moving contact, a normal-opened contact and a normal-closed contact of the third relay are connected to the first terminal of the wiper motor, the power source and a moving contact of the fourth relay, respectively; and a normal-closed contact of the fourth relay is connected to the movable contact of the position switch and a normal-opened contact of the fourth relay is grounded. Therefore, the second transistor is turned to the on-state according to the output of a high-level signal (low-speed driving signal) from the low-speed driving signal output port of the controller, and an electric current is supplied to the wiper motor from the second terminal (low brush) to the first terminal (common brush) through the fourth relay switched on, thereby rotating the wiper motor in the forward direction in the low speed. On the other side, the first transistor is turned to the on-state according to the output of a high-level signal (high-speed driving signal) from the high-speed driving signal output port of the controller, and an electric current is supplied to the wiper motor from the third terminal (high brush) to the first terminal (common brush) through the first, second and third relays switched on, thereby rotating the wiper motor in the reverse direction in the high speed. Furthermore, in the case where the controller does not supply neither the low-speed driving signal nor the high-speed driving signal, all the relays become the off-state, however the wiper motor continues to rotate in the forward direction at the low speed by forming the current supplying circuit during the movable contact of the position switch is on the low-potential plate grounded, and the wiper motor is stopped by forming an armature short circuit when the movable contact comes in contact with the high-potential plate after separating from the low-potential plate of the position switch.

In the wiper control device according to the other embodiment of this invention, which is provided with the circuit having two resistors connected to the power source in series and a diode connected between a node of the two resistors and the collector of the first transistor, the other end of the two resistors is connected in the middle of a connection wire between the movable contact of the position switch and a position signal monitoring port of the controller and the diode permits an electric current to pass through toward the first transistor. The position signal on low-level is supplied to the position signal monitoring port of the controller even when the movable contact of the position switch is on the opening between the high and low-potential plates in a case where the high-level signal (high-speed driving signal) is generated form the high-speed driving signal output port of the controller because the mode of the two resistors is grounded through the diode and the first transistor in on-state. The other side, the position signal on high-level regulated through the two resistors is supplied to the position signal monitoring port of the controller even when the movable contact is on the opening between the high and low-potential plates of the position switch in a case where the high-speed driving signal is not generated from the controller because the first transistor is in the off-state.

In the wiper control device according to the further preferable embodiment of this invention, which is provided with the backup circuit including further two transistors, two diodes and two capacitors, the second diode is connected between the third and fourth transistors, the third diode is connected between the fourth transistor and a terminal of the wiper switch to be grounded by operating the wiper switch into the high-speed mode and permits an electric current to pass through toward the wiper switch; emitter of the third transistor is grounded, collector and base of the third transistor are connected to the power source and a watchdog signal output port of the controller through the first capacitor, respectively; collector and base of the fourth transistor are connected to the other end of the relay coil of the fourth relay in the motor driving circuit and cathode of the second diode, respectively; and anode of the second diode is connected to collector of the third transistor and grounded through the second capasitor. In the case where the watchdog signal from the watchdog signal output port of the controller becomes extinct, the third transistor becomes to the off-state and the fourth transistor becomes to the on-state, so that the relay coil of the fourth relay is excited through the third diode and the wiper switch, thereby switching on the fourth relay and rotating the wiper motor in the forward direction at the low speed by operating the wiper switch into the high-speed mode.

DESCRIPTION OF PREFERRED EMBODIMENT

This invention will be explained below more concretely on basis of FIG. 1 to FIG. 10.

Figure 1:
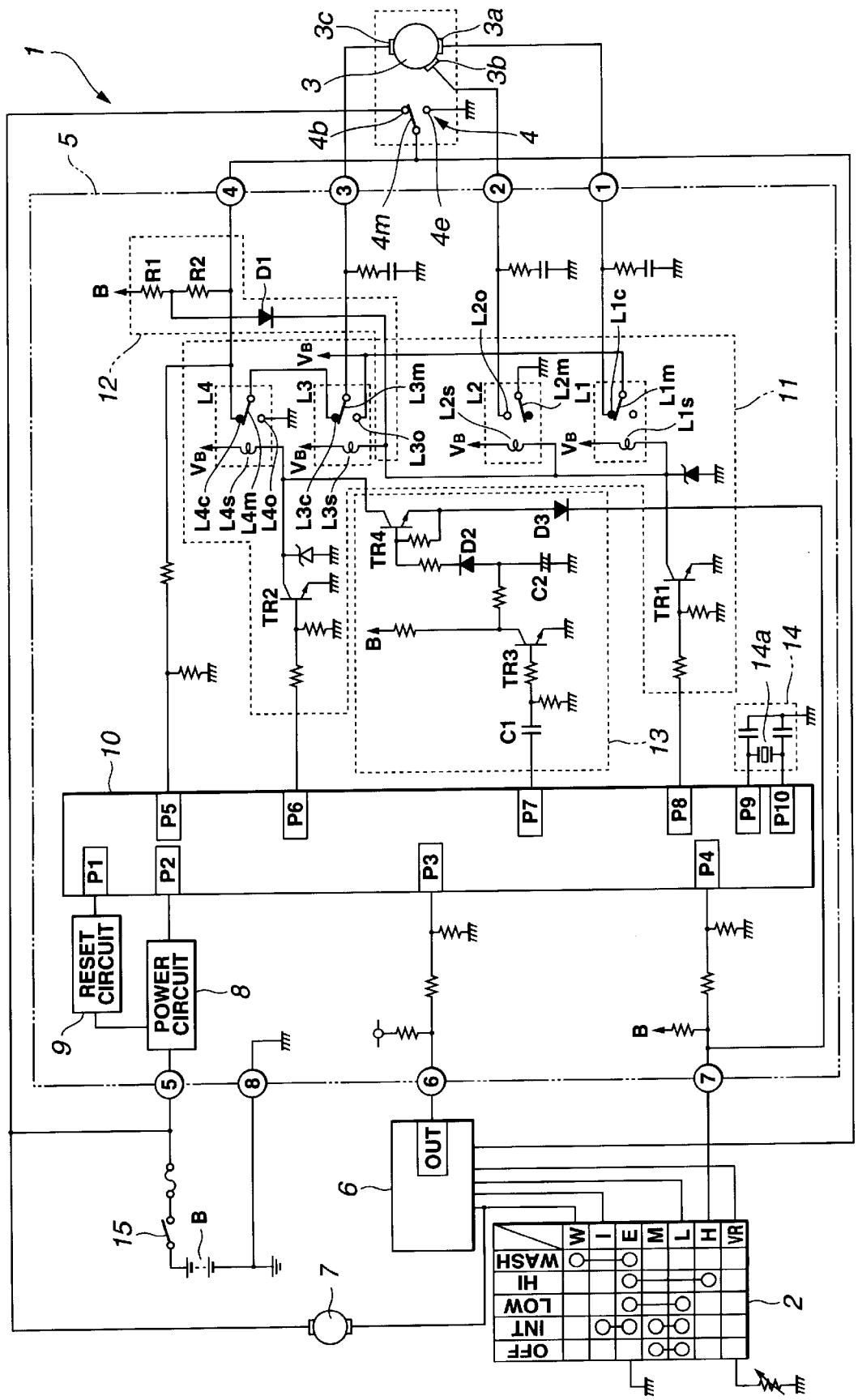
FIG. 1 is a circuit diagram of the wiper control device according to an embodiment of this invention.

FIGS. 1 to 10 are drawings for explaining control and structure of the wiper control device according to an embodiment of this invention, and FIG. 1 is a circuit diagram of the wiper control device.

The wiper control device 1 shown in FIG. 1 is mainly composed of a wiper switch 2, a wiper motor 3, a position switch 4, a control unit 5, a pulse generator 6 and a washer motor 7, and the control unit 5 includes a power circuit 8, a reset circuit 9, a controller 10, a motor driving circuit 11, a regulating circuit 12, a backup circuit 13 and an oscillating circuit 14.

The wiper switch 2 is designed so as to be possible to select the operation mode of the wiper apparatus among a stop mode (OFF), an intermittent mode (INT), a low-speed mode (LOW), a high-speed mode (HI) and a wash mode (WASH), H-terminal of the wiper switch 2 is connected to a high-speed command signal input port P4 of the controller 10 through No.7 terminal of the control unit 5, and L-terminal, I-terminal and W-terminal of the wiper switch 2 are connected to a low-speed command signal input terminal P3 of the controller 10 through the pulse generator 33 and No.6 terminal of the control unit 5. When the wiper switch 2 is operated into the high-speed mode (HI), the No.7 terminal of the control unit 5 is grounded through the H-terminal and E-terminal of the wiper switch 2 and a low-level signal is fed into the high-speed command signal input port P4 of the controller 10 as a high-speed command signal, whereby the selection of the high-speed mode is recognized by the controller 10.

If the wiper switch 2 is operated into the low-speed mode (LOW), the No.6 terminal of the control unit 5 is grounded through the pulse generator 6 (non-actuation), the L-terminal and the E-terminal of the wiper switch 2 and a low-level signal is fed into the low-speed command signal input port P3 of the controller 10 as a low-speed command signal, whereby the selection of the low-speed mode is recognized by the controller 10.

Furthermore, when the wiper switch 2 is operated into the intermittent mode (INT), the No.6 terminal of the control unit 5 is grounded intermittently through the pulse generator 6 (actuation), the L-terminal and the E-terminal of the wiper switch 2, whereby the wiper motor 2 is operated intermittently at a low speed. If the wiper switch 2 is operated into the wash mode (WASH), the W-terminal of the wiper switch 2 is grounded through the E-terminal, whereby the washer motor 7 starts the rotation and a cleansing liquid is sprayed against the windshield glass.

The wiper motor 3 is a geared electric motor rotatable in the forward and reverse directions and provided with a first terminal 3c (command brush terminal), a second terminal 3a (low brush terminal) and a third terminal 3b (high brush terminal), the first terminal 3c of the wiper motor 3 is connected to a moving contact L3m of a third relay L3 in the motor driving circuit 11 (described later) through No.3 terminal of the control unit 5, the second terminal 3a of the wiper motor 3 is connected to a normal-closed contact L1c of a first relay L1 in the motor driving circuit 11 through No.1 terminal of the control unit 5, and the third terminal 3b of the motor 3 is connected to a normal-opened contact L2o of a second relay L2 in the motor driving circuit 11 through No.2 terminal of the control unit 5. The wiper motor 3 is so designed as to rotate in the forward direction at a low speed according to an electric current flowing to the first terminal 3c from the second terminal 3a and as to rotate in the reverse direction at a high speed according to an electric current flowing to the third terminal 3b from the first terminal 3c.

The wiper motor 3 is mechanically connected to a wiper linkage for actuating a wiper blade 20 reciprocatively as shown in FIG. 2, and a motor arm 21 is fixed to an output shaft 3s of the wiper motor 3 at the base end thereof.

The motor arm 21 is disposed with an eccentric bush 22 rotatably around an eccentric shaft 22a in a range of 180° at the opposite end (top end) thereof, and the motor arm 21 is connected to a link connecting rod 23 through the eccentric bush 22. The opposite end of the link connecting rod 23 is connected to one end of a pivot arm 24 secured to a pivot shaft 25 at the opposite end, the pivot shaft 25 is fixed with the base end of a wiper arm 26 at the opposite end and the wiper arm 26 is fitted with a wiper blade 20 at the top end thereof. Accordingly, when the wiper motor 3 is actuated, the rotation of the wiper motor 3 is transmitted to the link connecting rod 23 as reciprocating motion through the motor arm 21, the reciprocating motion of the link connecting rod 23 is converted into oscillatory motion of the wiper arm 26 and the wiper blade 20 through the pivot arm 24 and the pivot shaft 25, and the wiper blade 20 is actuated swingingly on the windshield to wipe a windshield glass 30.

In the wiper linkage, the eccentric bush 22 is attached to the motor arm 21 as mentioned above, and designed so as to turn on the motor arm 21 as much as 180° according to the rotational direction of the motor arm 21. Namely, the motor arm 21 of the wiper linkage is so structured that the substantial length "La" of the motor arm 21 may become longer at the time the motor arm 21 fixed to the output shaft 3s of the wiper motor 3 is rotated in the direction of arrow A (clockwise direction) according to the low-speed forward rotation of the wiper motor 3 as shown in FIG. 2A, however the substantial length "Lb" of the motor arm 21 may become shorter at the time the motor arm 21 is rotated in the direction of arrow B (anti-clockwise direction) according to the high-speed reverse rotation of the wiper motor 3 as shown in FIG. 2B.

Figure 2A:
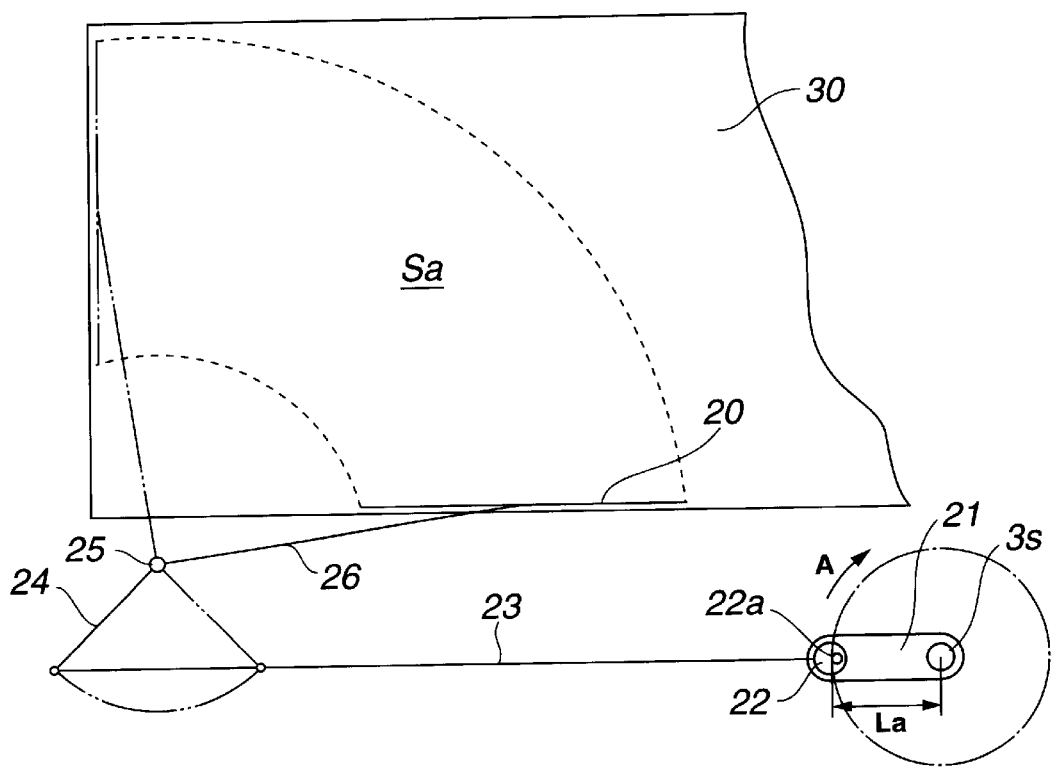
FIG. 2A is an explanatory drawing illustrating a relationship between rotational direction of the wiper motor, length of the motor arm and structural wiping range of the wiper blade in the wiper linkage controlled by the wiper control device shown in FIG. 1 at the low-speed mode.
Figure 2B:
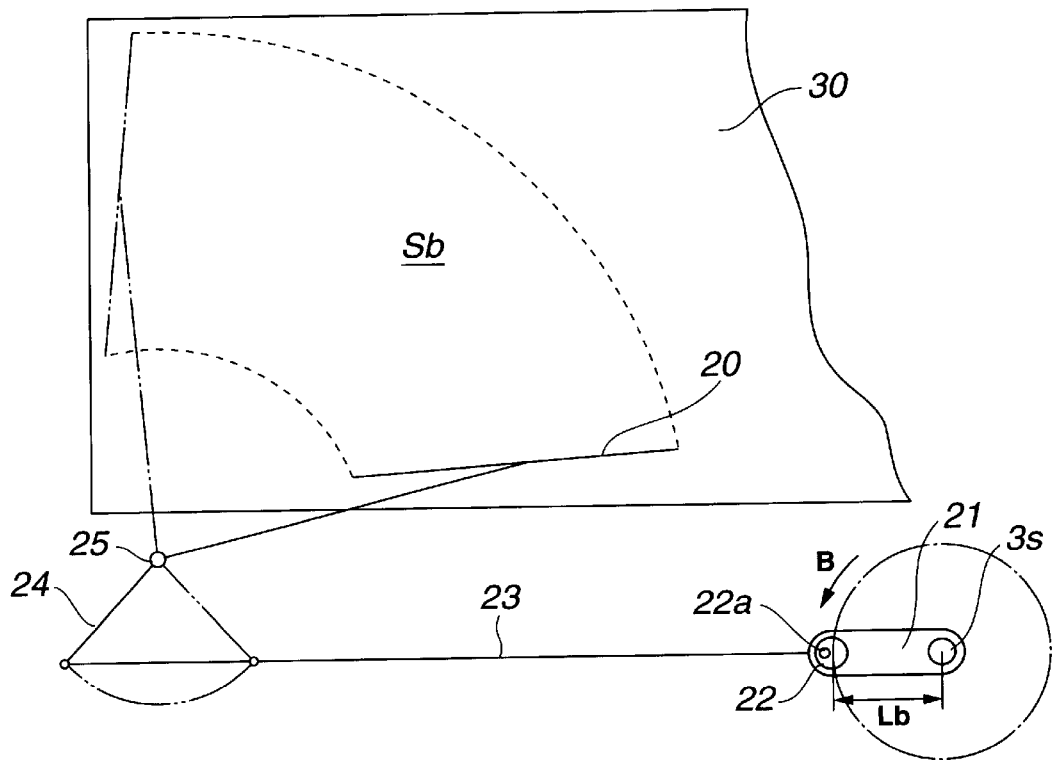
FIG. 2B is an explanatory drawing illustrating a relationship between rotational direction of the wiper motor, length of the motor arm and structural wiping range of the wiper blade in the wiper linkage shown in FIG. 2A at the high-speed mode.

Therefore, the structural wiping range "Sb" (static wiping range) of the wiper linkage at the time of high speed operation as shown in FIG. 2B becomes narrower as compared with the structural wiping range "Sa" at the time of low speed operation as shown in FIG. 2A, consequently it is possible to remove the difference between the actual wiping ranges (dynamic wiping ranges) enlarged by addition of inertial force of the wiper blade 20 to the structural wiping ranges "Sa" and "Sb" at the time of low speed and high speed operation.

Figure 3A:
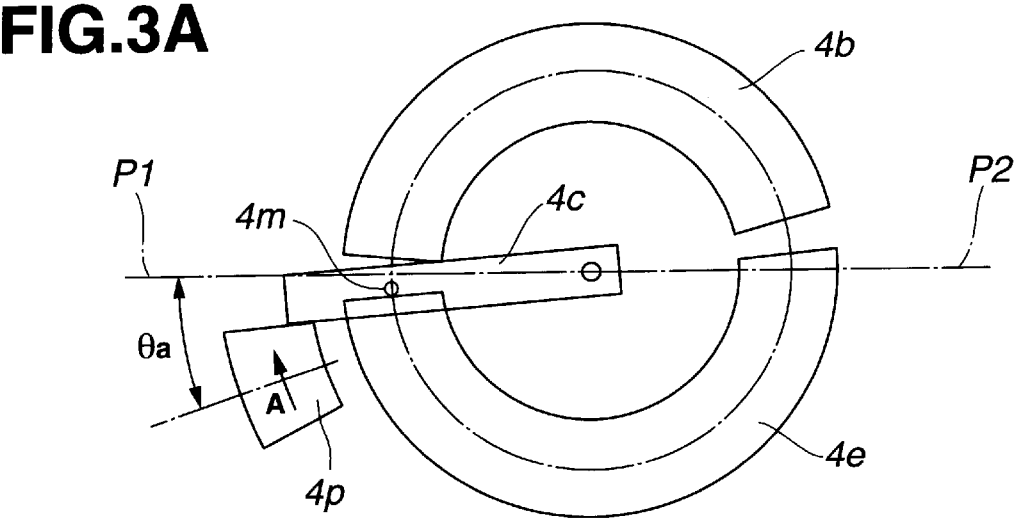
FIGS. 3A to 3C are schematic representations illustrating structure and working of the position switch of the wiper control device shown in FIG. 1.
Figure 3B:
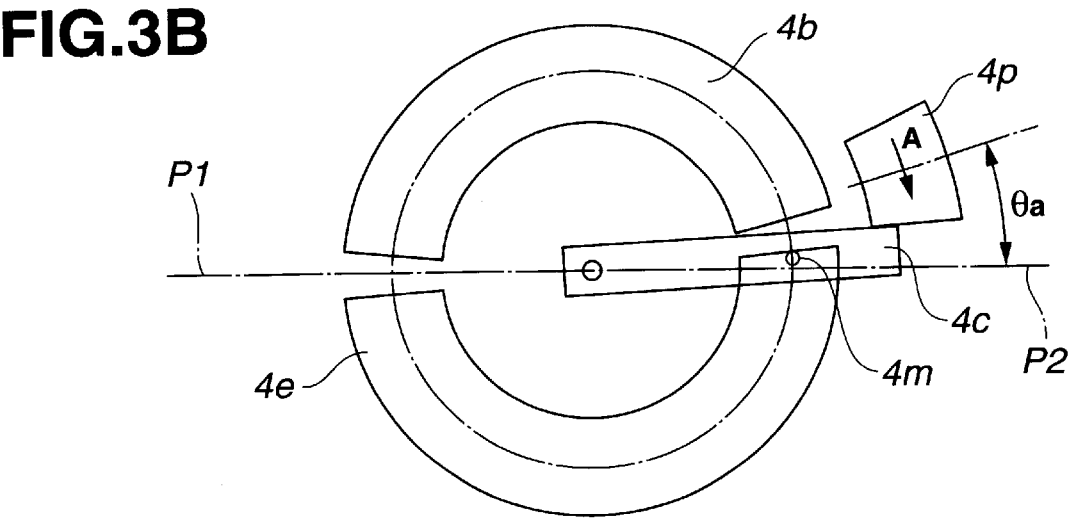
Figure 3C:
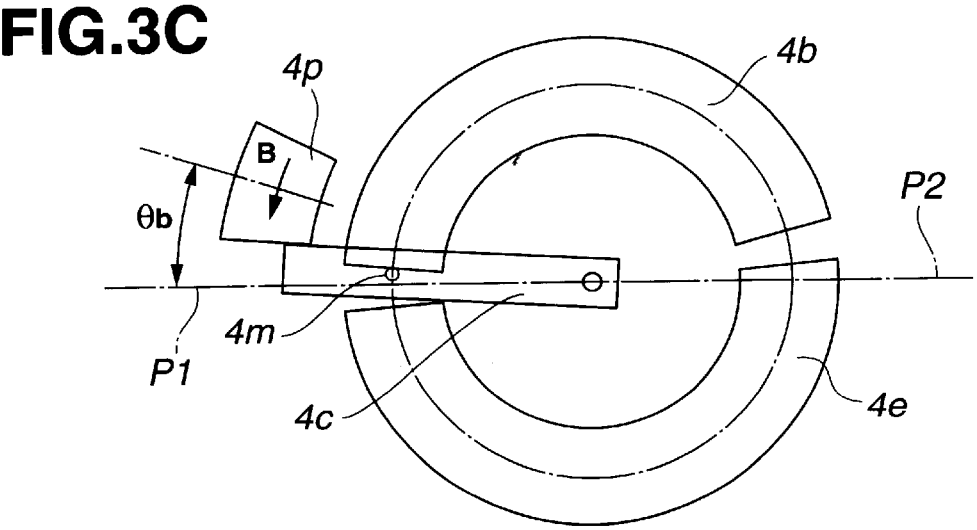

The position switch 4 is housed in the wiper motor 3, and provided with a high-potential plate 4b which is formed in an arch-like shape from electrically conductive material, connected to a power source B and disposed on one side of circumference of a circle (upper side in FIG. 13), a low-potential plate 4e which is formed similarly in the arch-like shape from the electrically conductive material, grounded and disposed on the other side of the circumference of the circle (lower side in FIG. 3), a push member 4p attached to the output shaft 3s of the wiper motor 3 so as to rotate together with the output shaft 3s, a clutch member 4c disposed coaxially with the high and low-potential plates 4b and 4e so as to be rotatable together with the push member 4p by being pushed against the push member 4p and a movable contact 4m attached to the clutch member 4c so as to slidingly touch the high and low-potential plates 4b and 4e as shown in FIGS. 3A to 3C. The movable contact 4m of the position switch 4 is connected to a position signal monitoring port P5 of the controller 10 and a normal-closed contact L4c of a fourth relay L4 in the motor driving circuit 11, respectively through No.4 terminal of the control unit 5. Accordingly, a high-level signal is supplied to the position signal monitoring port P5 of the controller 10 at the time when he movable contact 4m is on the high-potential plate 4b, and a low-level signal is supplied to the port P5 at the time when the movable contact 4m is on the low-potential plate 4e.

The clutch member 4c of the position switch 4c is so structured as to rotate together with the push member 4p by being pushed against the push member 4p as mentioned above, therefore, when the rotational direction of the wiper motor 3 is changed, the movable contact 4m is left behind in the present position at the time of starting the reversed rotation while the push member 4p makes nearly one revolution in the opposite direction together with the output shaft 3s.

Explanation will be given with reference to layout of the high-potential plate 4b, the low-potential plate 4e and the clutch member 4c of the position switch 4 in this embodiment. In a case where the push member 4p makes low-speed forward rotation in the direction of arrow A (clockwise direction) together with the output shaft 3s of the wiper motor 3, the position switch 4 is set so that the movable contact 4m may separate from the low-potential plate 4e at the time when the center of the push member 4p arrives in the point before the position P1 corresponding to the lower turning position of the wiper blade 20 as much as "θa" (=18°) as shown in FIG. 3A, and may come in contact with the low-potential plate 4e at the time when the center of the push member 4p arrives in the point before the position P2 corresponding to the upper turning position of the wiper blade 20 as much as "θa" (=18°) as shown in FIG. 3B. Further in a case where the push member 4p makes high-speed reverse rotation in the direction of arrow B (anti-clockwise direction) together with the output shaft 3s of the wiper motor 3, the position switch 4 is set so that the movable contact 4m may separate from the high-potential plate 4e at the time when the center of the push member 4p arrives in the point before the position P1 corresponding to the lower turning position of the wiper blade 20 as much as "θb" (=18°) as shown in FIG. 3C.

The power circuit 8 in the control unit 5 is a constant voltage circuit connected between No.5 terminal connected to the power source B through an ignition switch 15 and a power port P2 of the controller 10, and has a function to supply constant voltage to the controller 10 according to on-operation of the ignition switch 15.

The reset circuit 9 is a delay circuit connected between the power circuit 8 and a reset port P1 of the controller 10 and has a function to reset the controller 10, which is a microcomputer into the initial state by grounding the reset port P1 for predetermined time after the on-operation of the ignition switch 15.

The controller 10 is a microcomputer (microprocessor) as described above, and provided with a low-speed driving signal output port P6 for generating a low-speed driving signal in response to the low-speed command signal supplied from the wiper switch 2 through the low-speed command signal input port P3 and the position signal supplied from the position switch 4 through the position signal monitoring port P5, a high-speed driving signal output port P8 for generating a high-speed driving signal in response to the high-speed command signal supplied from the wiper switch 2 through the high-speed command signal input port P4 and the position signal supplied through the position signal monitoring port P5, and oscillation ports P9 and P10 to be connected with the oscillating circuit 41 in addition to the aforementioned respective ports such as the reset port P1, the power port P2, the low-speed command signal input port P3, the high-speed command signal input port P4 and the position signal monitoring port P5.

The motor driving circuit 11 is mainly composed of four relays L1, L2, L3 and L4, two transistors TR1 and TR2, respective ends of relay coils L1s, L2s and L3s of the first to third relays L1, L2 and L3 are connected to the power source side, and the other ends of the respective relay coils L1s, L2s and L3s are connected to the collector of the first transistor TR1 of which emitter is grounded and of which base is connected to the high-speed driving signal output port P8 of the controller 10.

A moving contact L1m of the first relay L1 is connected to the power source side together with a normal-opened contact L3o of the third relay L3, and the normal-closed contact L1c of the first relay L1 is connected to the second terminal (low brush) 3a of the wiper motor 3 through the No.1 terminal of the control unit 5 as mentioned above. Furthermore, a moving contact L2m of the second relay L2 is grounded, and the normal-opened contact L2o of the second relay L2 is connected to the third terminal (high brush) 3b of the wiper motor 3 through the No.2 terminal. The moving contact L3m of the third relay L3 is connected to the first terminal (common brush) 3c of the wiper motor 3 through the No.3 terminal, and a normal-closed contact L3c of the third relay L3 is connected to a moving contact L4m of the fourth relay L4.

One end of a relay coil L4s of the fourth relay L4 is similarly connected to the power source side and another end of the relay coil L4s is connected to the collector of the second transistor TR2 of which emitter is grounded and of which base is connected to the low-speed driving signal output port P6 of the controller 10. Further, a normal-opened contact L4o of the fourth relay L4 is grounded, the normal-closed contact L4c of the fourth relay L4 is connected to the first terminal 3c of the wiper motor 3 through the No.3 terminal of the control unit 5 and the moving contact L4m is connected to the normal-closed contact L3c of the third relay L3 as described above.

The circuit 12 is composed of two resistors R1 and R2, and a diode D1, has a function to regulate the source voltage through the resistors R1, R2 and apply the regulated voltage to the connection wire between the position signal monitoring port P5 of the controller 10 and the movable contact 4m of the position switch 4, and the node between the resistors R1 and R2 is connected to the collector of the first transistor TR1 through the diode D1.

According to the circuit 12, when the high-speed driving signal is not generated from the high-speed driving signal output port P8 of the controller 10, the first transistor TR1 is in the off-state, so that a high-level signal regulated through the resistors R1, R2 is supplied to the position signal monitoring port P5 of the controller 10 even if the movable contact 4m of the position switch 4 separates from the high-potential plate 4b and is on the opening between the both plates 4b and 4e. The other side, when the high-speed driving signal is generated from the high-speed driving signal output port P8, the transistor TR1 becomes to the on-state and the node between the resistors R1 and R2 is grounded through the diode D1 and the transistor TR1, accordingly the position signal to be supplied into the position signal monitoring port P5 changes into a low-level at the same time of separation of the movable contact 4m of the position switch 4 from the high-potential plate 4b.

Accordingly, when the high-potential plate 4b and the low-potential plate 4e of the position switch 4 are arranged as shown in FIG .3, the position signal to be supplied into the position signal monitoring port P5 of the controller 10 changes from the low-level to the high-level and the controller is possible to detect the signal change (L→H) in the position signal at the same time when the push member 4p arrives at the point before the position P1 corresponding to the lower turning position of the wiper blade 20 as much as "θa" (18°) in this embodiment and the movable contact 4m separates from the low-potential plate 4e as shown in FIG. 3A in the case where the push member 4p makes the low-speed forward rotation in the direction of arrow A together with the output shaft 3s of the wiper motor 3 (the high-speed driving signal is not generated in this time). Therefore, it becomes possible to stop the wiper blade 20 accurately in the lower turning position and to switch the wiper mode into the high-speed mode without passing the wiper blade 20 through the lower turning position by stopping or reversing the wiper motor 3 simultaneously with the detection of the signal change.

Furthermore, in the case where the push member 4p makes the low-speed forward rotation similarly, there is not signal change in the position signal at the time when the movable contact 4m separates from the high-potential plate 4b, but the position signal changes from the high-level to the low-level and the controller 10 detects the signal change (H→L) in the position signal at the same time when the push member 4p arrives in the point before the position P2 corresponding to the upper turning position of the wiper blade 20 as much as "θa" (18°) and the movable contact 4m touch the low-potential plate 4e as shown in FIG. 3B. Accordingly it is possible to prevent over passage of the wiper blade 20 caused by inertia and possible to change the wiper mode into the high-speed mode at the upper turning position accurately by changing the rotational direction of the wiper motor 3 in response to the signal change in the position signal.

On the other side, in the case where the push member 4p makes the high-speed reverse rotation in the direction of arrow B together with the output shaft 3s of the wiper motor 3 (high-speed driving signal is generated) as shown in FIG. 3C, the position signal to be supplied into the position signal monitoring port P5 changes from the high-level to the low-level and the controller 10 detects signal change (H→L) in the position signal at the same time when the push member 4p arrives in the point before the position P1 corresponding to the lower turning position of the wiper blade 20 as much as "θb" (18°) and the movable contact 4m separates from the high-potential plate 4b. Therefore, it is possible to turn the wiper blade 20 at the lower turning position accurately and possible to change the high-speed mode into the low-speed mode by switching over the output signal from the high-speed driving signal into the low-speed driving signal at the time of detecting the signal change.

Namely, the circuit 12 has a function to cause the signal change in the position signal supplied to the position signal monitoring port P5 of the controller 10 at the time when the wiper blade 20 arrives in the predetermined position before the lower turning position in both cases of the low-speed mode and the high-speed mode regardless of the rotational direction of the wiper motor 3.

With respect to the arrangement of the plates 4b and 4e in the position switch 4, although the shifting angles θa and θb are set equally at 18 degrees in this embodiment, it is also possible to set the angle θb larger than the angle θa considering the difference in the inertial force caused by the difference of the operation speed of the wiper blade 20.

The backup circuit 13 is mainly composed of two transistors TR3, TR4, two capacitors C1, C2 and two diodes D2, D3. The base of the transistor TR3 is connected to the watchdog signal output port P7 of the controller 10 through the capacitor C1, the emitter is grounded and the collector of the transistor TR3 is connected to the power source B and the base of the transistor TR4 through resistors and the diode D2. The collector of the transistor TR4 is connected to the other end of the relay coil L4s of the fourth relay L4 in the motor driving circuit 11, the emitter of the transistor TR4 is connected to the No.7 terminal of the control unit 5 through the diode D3 and the No.7 terminal is connected to the H-terminal of the wiper switch 2 as mentioned above.

Figure 5A:
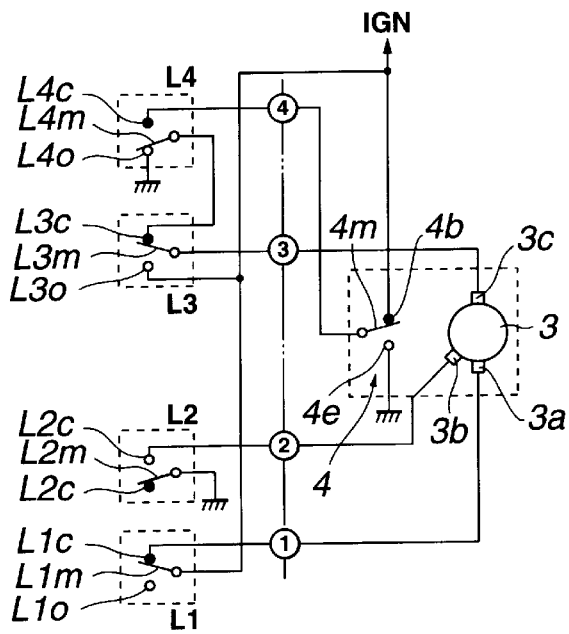
FIG. 5A is a circuit diagram illustrating the motor driving circuit of the wiper control device shown in FIG. 1 in the state where the wiper motor is not actuated.

In the backup circuit 13, the capacitor C1 is charged, the transistor TR3 is switched on and the transistor TR4 is in the off-state so long as the watchdog signal is normally generated from the watchdog signal output port P7 of the controller 10, however if the output of the watchdog signal is interrupted by some failure, the capacitor C1 is discharged and the transistor TR3 is switched off, so that high potential voltage is applied to the base of the transistor TR4 according to charging of the capacitor C2. By operating the wiper switch 2 into the high-speed mode (HI) in this time, the relay coil L4s of the fourth relay L4 is grounded through the transistor TR4, the diode D3 and the H-terminal and the E-terminal of the wiper switch 2, so that the fourth relay L4 is switched on and the wiper motor 3 is supplied with an electric current in the direction for low-speed forward rotation as shown in FIG. 5B (described later), whereby the wiper blade 18 is operated in the low speed.

Namely, in the wiper apparatus of this embodiment, it is possible to actuate the wiper blade 20 in the low-speed by operating the wiper switch 2 into the high-speed mode (HI) even if the microcomputer of the controller 10 breaks down at the worst.

The oscillating circuit 14 is composed of a clock signal generator 14a and two capacitors, connected to the oscillation ports P9 and P10 and give a clock signal for the control to the controller 10.

An explanation will be given below about the control in the wiper control device 1 having the aforementioned structure on basis of the flow chart, the time charts or so.

(1) Start of Control

Figure 4:
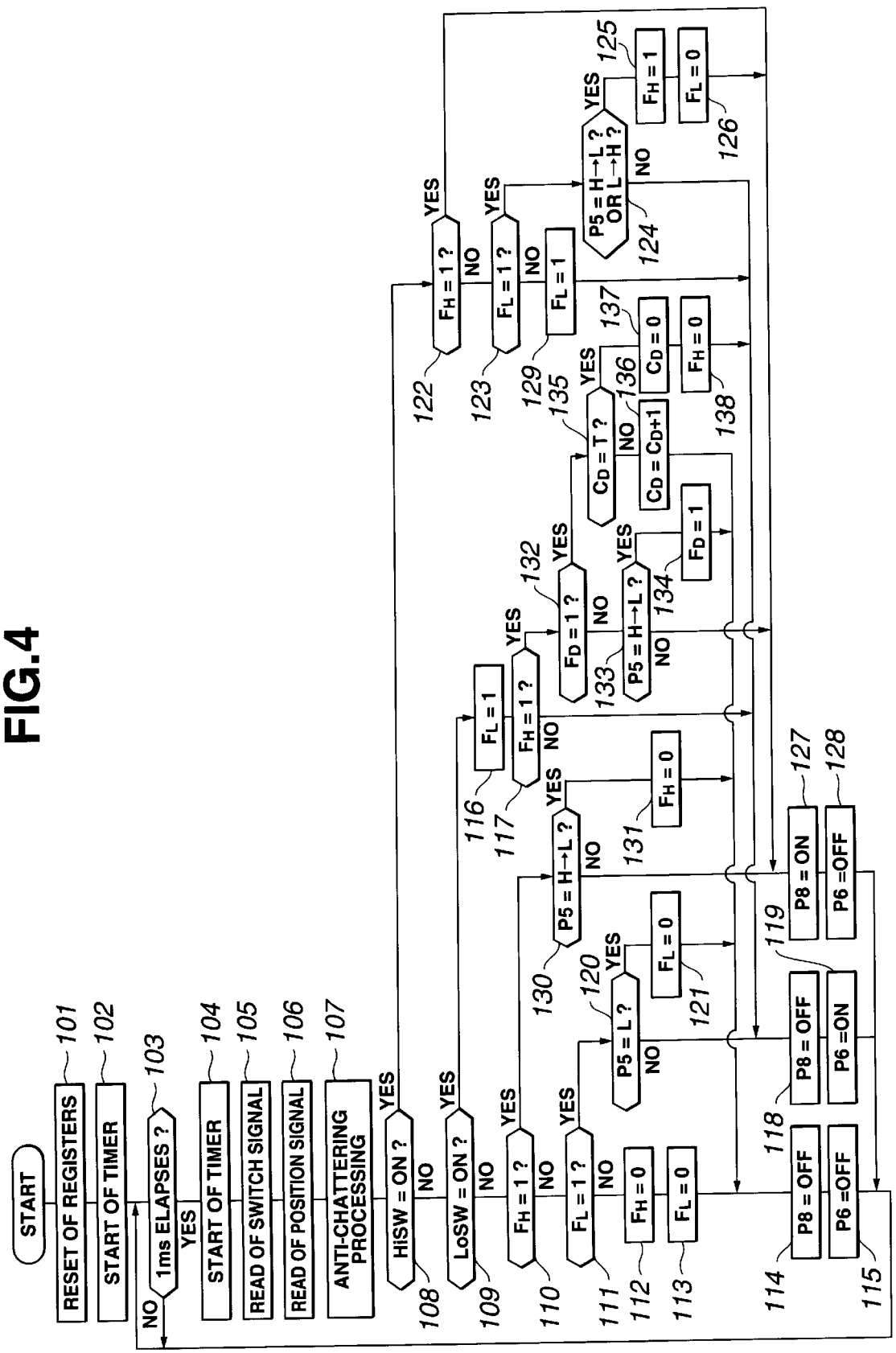
FIG. 4 is a flow chart illustrating the control in the wiper control device shown in FIG. 1.

In the flow chart shown in FIG. 4, when the control is started by switching on the main switch of the control device 1, the internal registers are initialized at step 101, first of all.

A timer starts at step 101, and stand-by processing is executed for 1 ms at step 103 in order to maintain a program period in 1 ms at all times. The control proceeds to step 104 after waiting for 1 ms, the timer starts again after being cleared at the step 104.

Successively, the switch signal supplied from the wiper switch 2 and the position signal supplied from the position switch 4 are read at steps 105 and 106 and anti-chattering processing is carried out at step 107. Namely, the control proceeds to the next step after reading the signals supplied from the wiper switch 2 and the position switch 4 and confirming these signals to be stable without changing at the step 107.

It is decided at steps 108 and 109 whether the wiper switch 2 is operated or not, that is whether a signal is supplied to the command signal input port P3 or P4 of the controller 10 or not. In a case where the signal is not supplied to neither port P3 nor P4 (NO), decision is done whether a high-speed operation flag $F_H$ and a low-speed operation flag $F_L$ are set or not at steps 110 and 111, respectively. In this case, the both flags $F_H$ and $F_L$ are reset (=0) at step 101 (NO), therefore the flags $F_H$ and $F_1$ are cleared again at steps 112 and 113, and the high-speed driving signal output port P8 and the low-speed driving signal output port P6 of the controller 10 are turned off at steps 114 and 115. Therefore, the respective relays L1 to L4 become to off-states entirely as shown in FIG. 5A since any signal is not generated from the controller 10, and the wiper motor 3 is held in a state of stopping. The control returns to the step 103 and the aforementioned processing is repeated until the wiper switch 2 is operated.

(2) Low-speed Operation

Figure 6A:
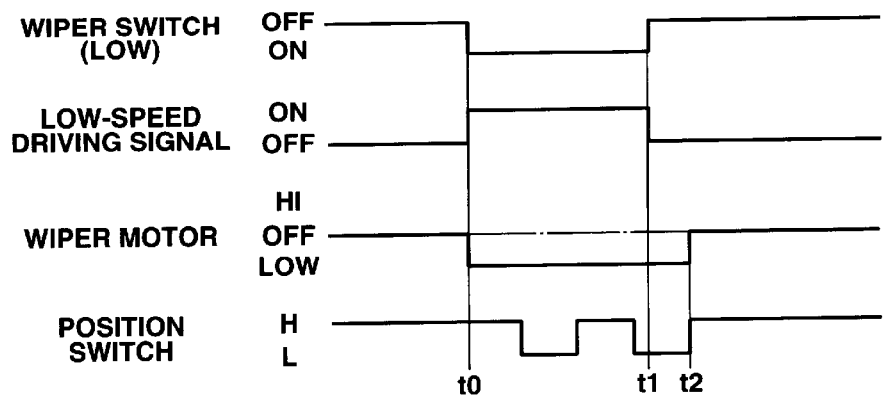
FIG. 6A is a time chart illustrating the control at the time of off-operation in the low-speed mode.
Figure 6B:
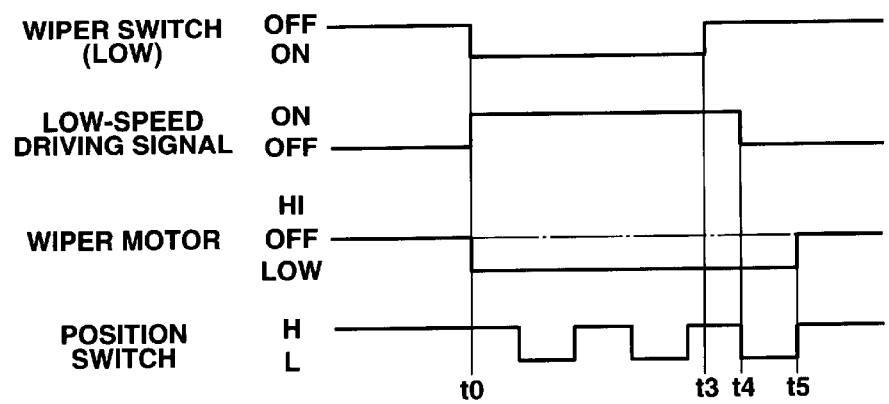
FIG. 6B is a time chart similarly illustrating the control at the time of off-operation in the high-speed mode.

When the wiper switch 2 is operated into the low-speed mode (LOW) in the off-state of the wiper switch 2 at time t0 shown in FIGS. 6A and 6B, the low-speed command signal input port P3 of the controller 10 is grounded through the wiper switch 2, accordingly the control proceeds to step 116 from the step 109 by deciding the low-speed switch to be switched on (YES) at the step 109 of the flow chart shown in FIG. 4. At the step 116, the low-speed operation flag $F_L$ is set (=1), and decision is done whether the high-speed operation flag $F_H$ is set or not at step 117. The control proceeds to steps 118 and 119 from the step 117 as the high-speed operation flag $F_H$ is cleared (NO) at the step 112, the low-speed driving signal is generated from the low-speed driving signal output port P6 at the step 119 without outputting the signal from the high-speed driving signal output port P8 of the controller 10.

According to the output signal from the low-speed driving signal output port P6, the transistor TR2 in the motor driving circuit 11 becomes to the on-state and the coil L4s of the relay L4 is excited and this fourth relay L4 is only changed on as shown in FIG. 5B. Accordingly, a feeder circuit to the wiper motor 3 is formed, which connects the second terminal 3a (low brush) of the wiper motor 3 with the power source B through the normal-closed contact L1c of the first relay L1 and grounds the first terminal 3c of the wiper motor 3 through the normal-closed contact L3c of the third relay L3 and the normal-opened contact L4o of the fourth relay L4, whereby the wiper motor 3 starts the forward rotation in the low speed and the wiper blade 20 starts the wiping operation in the low speed. After this, the control returns to the step 103, the aforementioned processing is repeated until the wiper switch 2 is operated again, and the low-speed wiping operation of the wiper blade 20 is continued.

(3) Off-operation in Low-speed Mode

When the wiper switch 2 is switched off in the state where the wiper blade 20 is actuated in the low speed (low-speed mode), the low-speed command signal from the wiper switch 2 disappears (the low-speed command signal input port P3 is not grounded), the low-speed switch is decided not to be switched on (NO) at the step 109 of the flow chart shown in FIG. 4. The control proceeds to the step 111 after deciding the high-speed operation flag $F_H$ not to be set (NO) at the step 110 and decision is done at the step 111 as to the state of low-speed operation flag $F_L$. The low-speed operation flag $F_L$ is set (YES) at the step 116 in this case, the control proceeds to step 120 from the step 111 and the input signal supplied to the position signal monitoring port P5 of the controller 10 from the position switch 4, that is the present position of the wiper blade 20 is referred at the step 120.

In a case where the wiper switch 2 is switched off at time t1 shown in FIG. 6A, that is at the time when the movable contact 4m is on the low-potential plate 4e of the position switch 4, in other words, at the time when the wiper blade 20 is moving toward the lower turning position (home position) from the upper turning position, the position signal inputted to the position signal monitoring port P5 is decided to be on the low-level (YES) at the step 120 since the movable contact 4m of the position switch 4 is grounded through the low-potential plate 4e. The control proceeds to the steps 114 and 115 after clearing the low-speed operation flag $F_L$ at step 121, and the low-speed driving signal from the low-speed driving signal output port P6 is interrupted at the step 115.

Figure 5C:
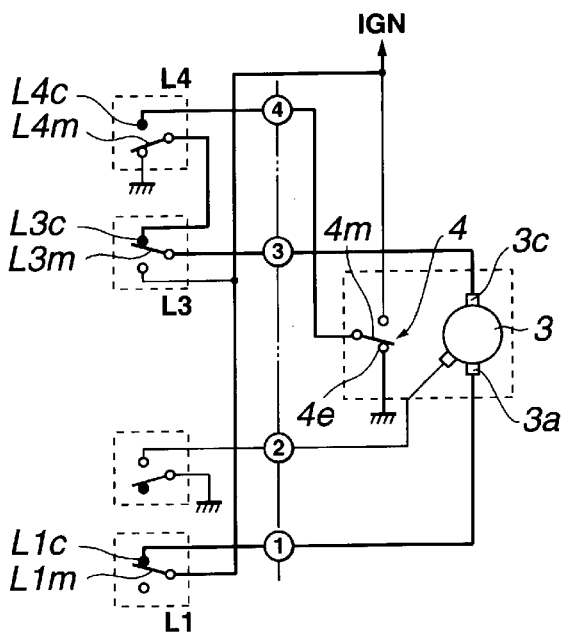
FIG. 5C is a circuit diagram illustrating a current supplying circuit formed by the motor driving circuit in the auto-stop control after off-operation.
Figure 5B:
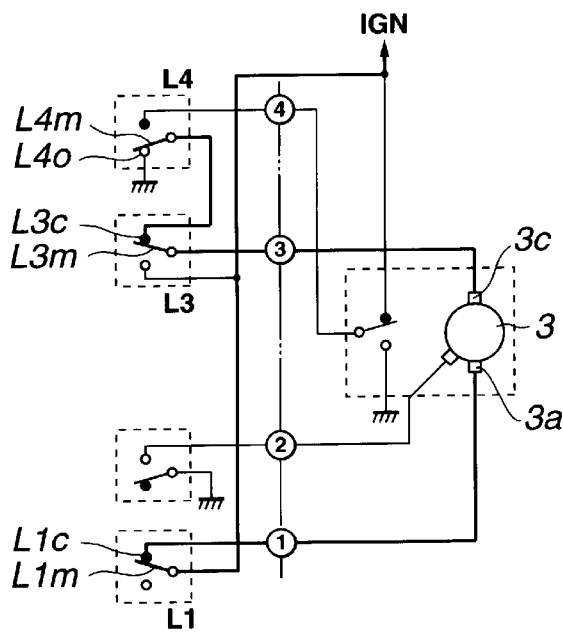
FIG. 5B is a circuit diagram illustrating a feeder circuit formed by the motor driving circuit in the low-speed mode.

Although the transistor TR2 becomes to the off-state, the coil L4s of the fourth relay L4 is unexcited and the all of the relays are turned off according to the interruption of the low-speed driving signal from the low-speed driving signal output port P6, a current supplying circuit is formed as shown in FIG. 5C, which connects the second terminal 3a of the wiper motor 3 to the power source B through the normal-closed contact L1c of the first relay L1 and grounds the first terminal 3c of the wiper motor 3 through the normal-closed contact L3c of the third relay L3, the normal-closed contact L4c of the fourth relay L4, the movable contact 4m and the low-potential plate 4e of the position switch 4 while the movable contact 4m is in contact with the low-potential plate 4e, whereby the low-speed forward rotation of the wiper motor 3 is kept on. when the wiper blade 20 arrives in the position predetermined in just before the lower turning position before long at time t2 shown in FIG. 6A, the movable contact 4m separates from the low-potential plate 4e of the position switch 4 and the current supplying circuit is shut off, however the wiper motor 3 is further rotated by inertia, and then an armature short circuit is formed as shown in FIG. 5A at the same time when the wiper blade 20 arrives at the lower turning position and the movable contact 4m comes in contact with the high-potential plate 4b, thereby stopping the wiper motor 3 and further stopping the wiper blade 20 at the lower turning position (home position).

In another case where the wiper switch 2 is switched off from the low-speed mode (LOW) at time t3 shown in FIG. 6B, that is at the time when the movable contact 4m is on the high-potential plate 4b of the position switch 4, in other words, at the time when the wiper blade 20 is moving toward the upper turning position from the lower turning position, the position signal inputted to the position signal monitoring port P5 is decided not to be on the low-level (NO) at the step 120 because the movable contact 4m is connected with the power source B through the high-potential plate 4b of the position switch 4 and the position signal monitoring port P5 becomes to the high-level. Therefore, the control proceeds to the steps 118 and 119 from the step 120, and the output of the low-speed driving signal is maintained from the low-speed driving signal output port P6, the low-speed forward rotation of the wiper motor 3 is continued.

When the movable contact 4m of the position switch 4 is grounded through the low-potential plate 4e at time t4 and the position signal monitoring port P5 is decided to be on the low-level (YES) at the step 120, the control proceeds to the steps 114 and 115 through the step 121 and the low-speed driving signal from the low-speed driving signal output port P6 is interrupted at the step 115. After this, the wiper motor 3 continues the forward rotation in the low speed through the current supplying circuit as mentioned above, and stops by formation of the armature short circuit when the movable contact 4m comes in contact with the high-potential plate 4b after interruption of the current supplying circuit by separation of the movable contact 4m from the low-potential plate 4e of the position switch 4 (time t5 in FIG. 6B), thereby stopping the wiper blade 20 at the lower turning position (home position). An explanation will be given about the positional relationship between the wiper blade 20 (wiper linkage) and the movable contact 4m of the position switch 4 on basis of FIGS. 7A to 7D.

Figure 7A:
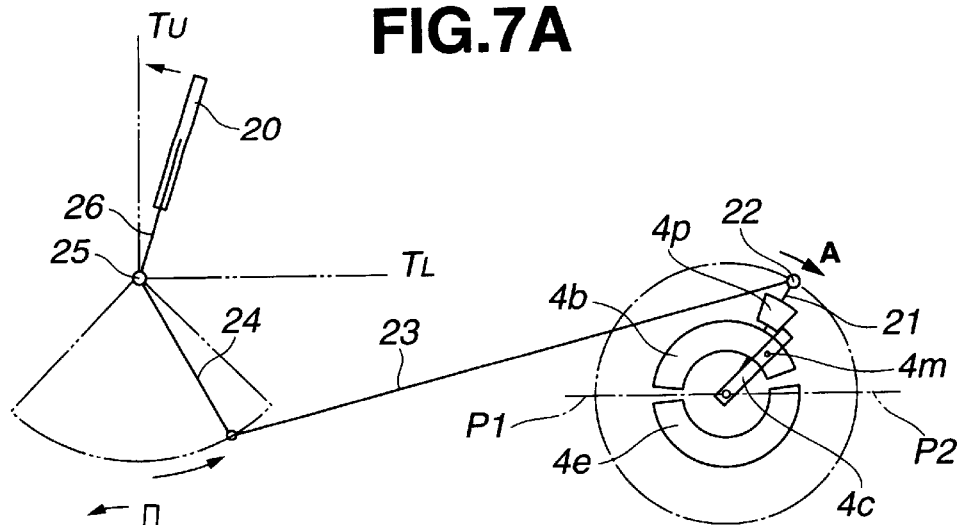
FIGS. 7A to FIG. 7D are explanatory drawings successively illustrating the positional relation between the wiper blade and the movable contact of the position switch in a case of off-operation in the low-speed mode.

When the wiper switch 2 is switched off at the time when the movable contact 4m is on the high-potential plate 4b of the position switch 4 as shown in FIG. 7A (at time t3 shown in FIG. 6B), that is when the wiper blade 20 is moving toward the upper turning position $T_U$ from the lower turning position $T_L$ (home position), the position signal is held in the high-level by the circuit 12 even after the movable contact 4m separates from the high-potential plate 4b, therefore the low-speed forward rotation of the wiper motor 3 is maintained until the movable contact 4m comes in contact with the low-potential plate 4e.

Figure 7B:
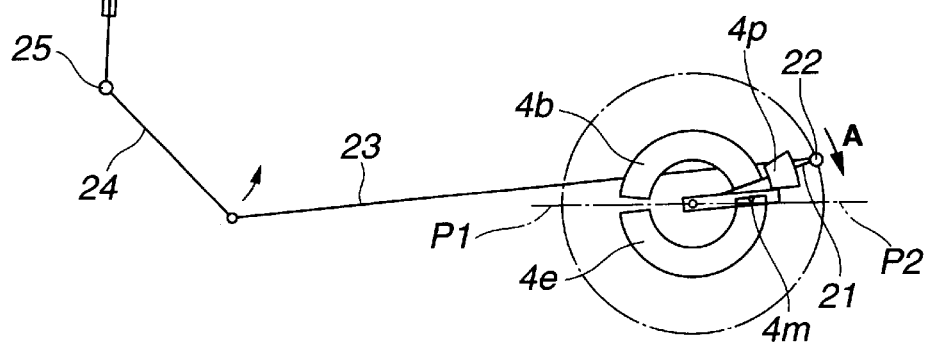

When the wiper blade 20 arrives in the predetermined position slightly before the upper turning position $T_U$ at time t4, the movable contact 4m comes in contact with the low-potential plate 4e of the position switch 4 as shown in FIG. 7B, and the position signal changes into the low-level thereby interrupting the output of the low-speed driving signal. However, the wiper motor 3 continues to rotate in the forward direction at the low speed through the current supplying circuit formed as shown in FIG. 5C, and the wiper blade 20 begins to move toward the lower turning position $T_L$ after arrival at the upper turning position $T_U$.

Figure 7C:
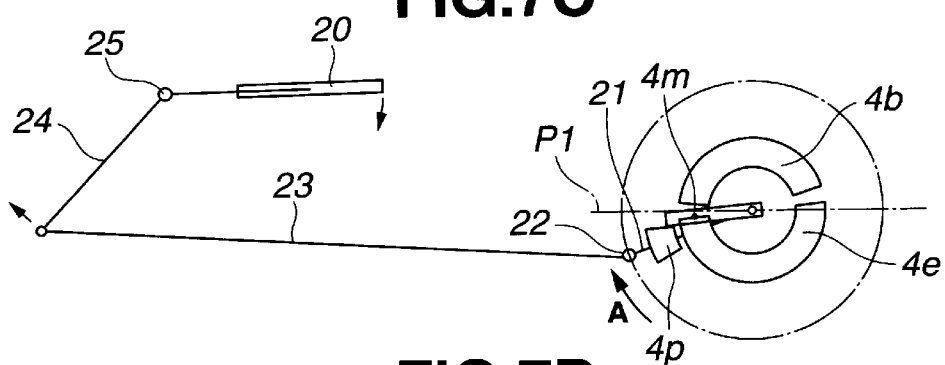
Figure 7D:
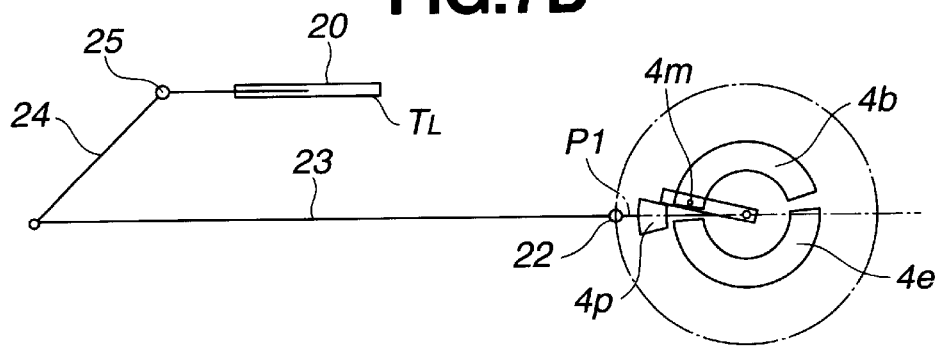

After this, when the wiper blade 20 arrives in the position predetermined before the lower turning position $T_L$ at time t5, the movable contact 4m separates from the low-potential plate 4e of the position switch 4 as shown in FIG. 7C and the current supplying circuit is shut off, however the wiper motor 3 continues to rotate by inertia, and stops by formation of the armature short circuit as shown in FIG. 5A at the time when the movable contact 4m touches the high-potential plate 4b of the position switch 4. Therefore, the wiper blade 20 stops at the lower turning position $T_L$ as shown in FIG. 7D.

(4) Switching Operation to High-speed Mode from Low-speed Mode

When the wiper switch 2 is switched from the low-speed mode (LO) to the high-speed mode (HI) in the state where the wiper blade 20 is actuated in the low speed, the high-speed command signal is supplied to the controller 10 at the same time of disappearance of the low-speed command signal. Namely, the high-speed command signal input port P4 of the controller 10 is grounded through the wiper switch 2, whereby the control proceeds to step 122 from the step 108 by deciding the high-speed switch to be switched on at the step 108 (YES) in the flow chart shown in FIG. 4, and decision is done as to whether the high-speed operation flag $F_H$ is set or not at the step 122.

The control proceeds to step 123 from the step 122 because the high-speed operation flag $F_H$ is not set yet in this time (NO) and decision is done as to the low-speed flag $F_L$ at the step 123. The control proceeds to step 124 through the step 123 since the low-speed operation flag $F_L$ is set at the step 116 during the previous low-speed operation (YES), and decision is done at the step 124 as to whether or not there is a negative going edge (H→L) or a positive going edge (L→H) in the position signal to be supplied to the position signal monitoring port P5 of the controller 10, in other words whether the wiper blade 20 arrives in the predetermined position before the upper turning position or the upper turning position or not. If the signal change is not caused in the position signal (NO), the control proceeds to the steps 118 and 119 from the step 124, and the output of the low-speed driving signal from the low-speed driving signal output port P6 is maintained, whereby the wiper motor 3 continues to rotate in the forward direction at the low speed until the position signal supplied from the position switch 4 changes.

When the wiper blade 20 arrives in the predetermined position just before the upper turning position or the lower turning position and the signal change takes place in the position signal from the position switch 4, the control proceeds to steps 125 and 126 from the step 124 (YES), the high-speed operation flag $F_H$ is set at the step 125 and the low-speed operation flag $F_L$ is cleared at the step 126. Furthermore, the high-speed driving signal is generated from the high-speed driving signal output port P8 at step 127 and the output signal from the low-speed driving signal output port P6 is interrupted.

Figure 5D:
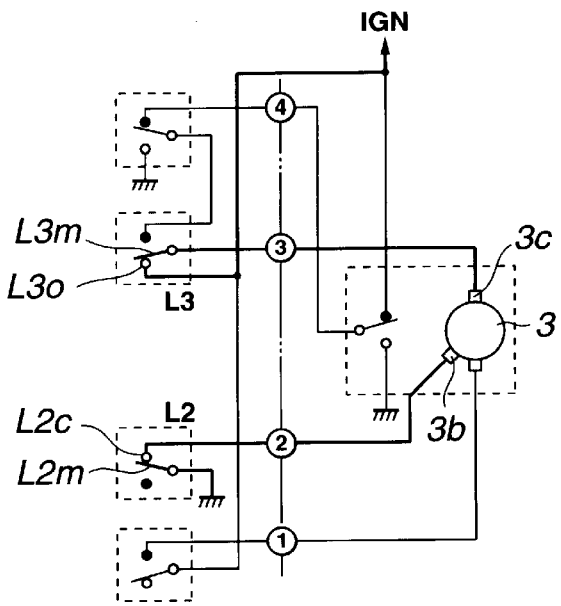
FIG. 5D is a circuit diagram illustrating a feeder circuit formed by the motor driving circuit in the high-speed mode.

According to the interruption of the output signal from the low-speed driving signal output port P6 of the controller 10, the transistor TR2 becomes to the off-state and the coil L4s of the fourth relay L4 is unexcited (OFF), and the transistor TR1 becomes to the on-state by the output signal from the high-speed driving signal output port P8, whereby the coils L1s, L2s and L3s of the relays L1, L2 and L3 are excited (ON), respectively. Accordingly, a feeder circuit for the wiper motor 3 is formed as shown in FIG. 5D, which connects the first terminal 3C of the wiper motor 3 to the power source B through the normal-opened contact L3o of the third relay L3 and grounds the third terminal 3b of the wiper motor 3 through the normal-opened contact L2o of the second relay L2, and the low-speed forward rotation of the wiper motor 3 is changed over to the high-speed reverse rotation.

Figure 6C:
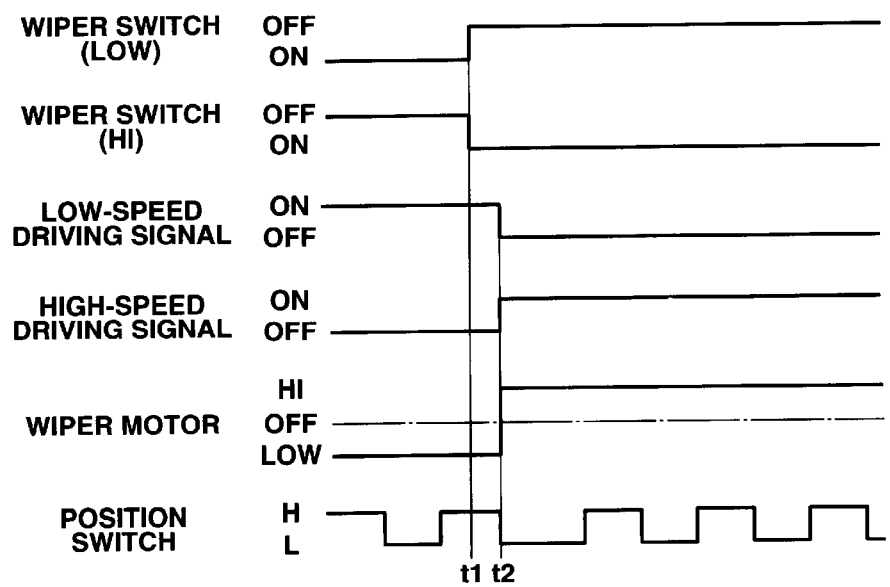
FIG. 6C is a time chart illustrating the control at the time of switching operation from the low-speed mode into the high-speed mode.
Figure 8A:
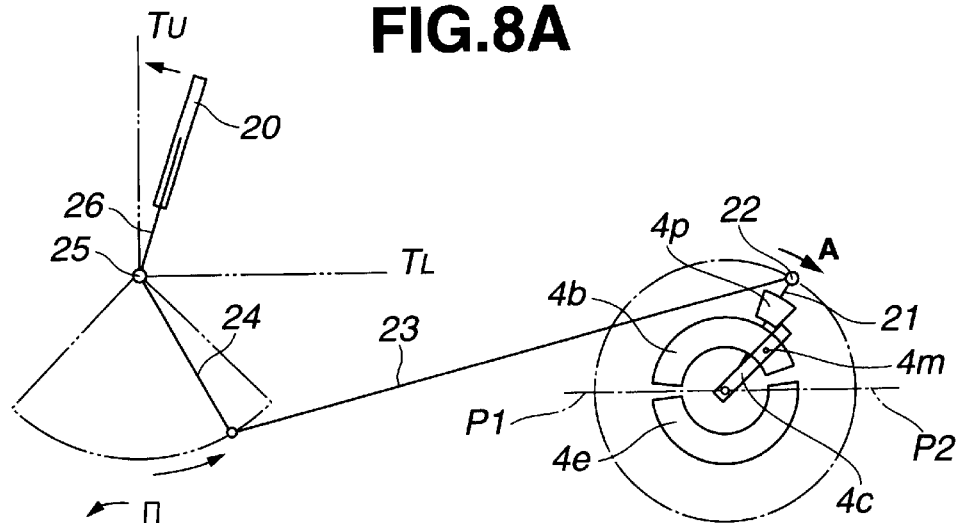
FIGS. 8A to FIG. 8D are explanatory drawings successively illustrating the positional relation between the wiper blade and the movable contact of the position switch in a case where the switching operation is carried out from the low-speed mode into the high-speed mode when the wiper blade is moving toward the upper turning position from the lower turning position.
Figure 8B:
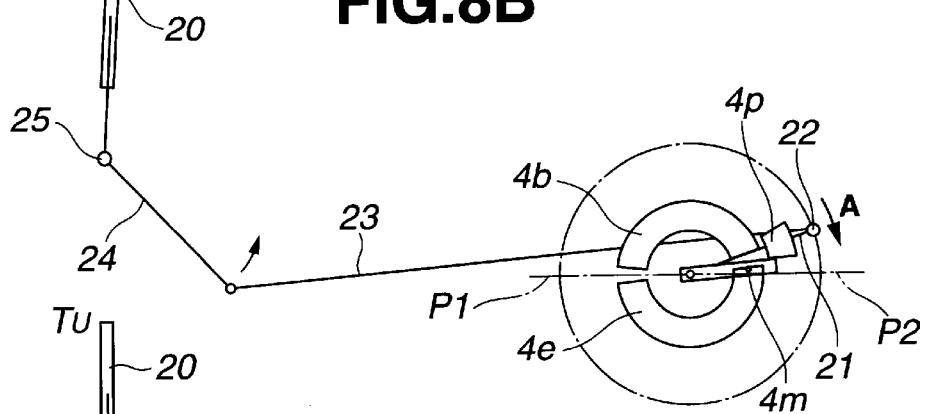
Figure 8C:
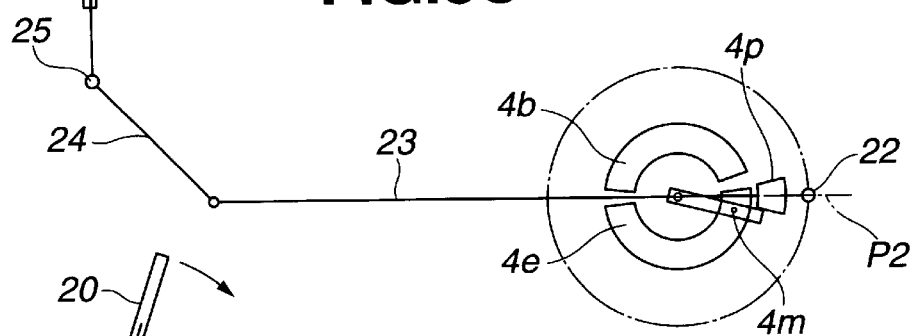

For example, in a case where the wiper switch 2 is switched over from the low-speed mode into the high-speed mode at time t1 shown in FIG. 6C, that is at the time when the wiper blade 20 is moving toward the upper turning position $T_U$ from the lower turning position $T_L$ as shown in FIG. 8A, the low-speed driving signal is switched over to the high-speed driving signal at time t2 when the movable contact 4m comes in contact with the low-potential plate 4e of the position switch 4 as shown in FIG. 8B and the negative going edge (H→L) appears in the position signal to be supplied to the position signal monitoring port P5 of the controller 10 (the position signal is held in the high-level through the circuit 12 until the movable contact 4m touches the low-potential plate 4e even after separating from the high-potential plate 4b as mentioned above), that is at the time when the wiper blade 20 arrives in the predetermined position just before the upper turning position $T_U$. However, the wiper motor 3 further continues to rotate in the forward direction (direction of arrow A) by inertia, and starts the high-speed reverse rotation at the time when the wiper blade 20 arrives at the upper turning position $T_U$ and the push member 4p of the position switch 4 reaches the point P2 as shown in FIG. 8C.

Figure 8D:
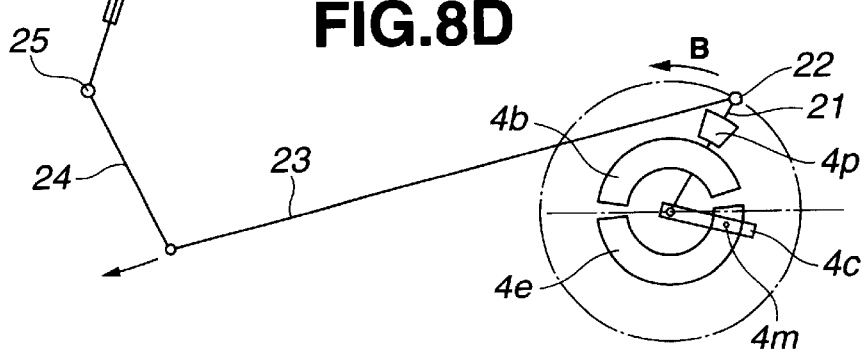

In this time, the movable contact 4m is left behind on the low-potential plate 4e together with the clutch member 4c according to the reverse rotation of the wiper motor 3 until the push member 4p comes in contact with the clutch member 4c on the opposite side after about one revolution of the push member 4p as shown in FIG. 8D. Furthermore, the eccentric bush 22 provided to the motor arm 21 turns on the motor arm 21 as much as 180° along with the reverse rotation (in the direction of arrow B) of the motor arm 21 secured to the output shaft 3s of the wiper motor 3, whereby the substantial length of the motor arm 21 becomes shorter into "Lb" from "La" as shown in FIGS. 2A and 2B. Accordingly, the actual wiping range in the high-speed mode becomes equal to that in the low-speed mode.

Figure 6D:
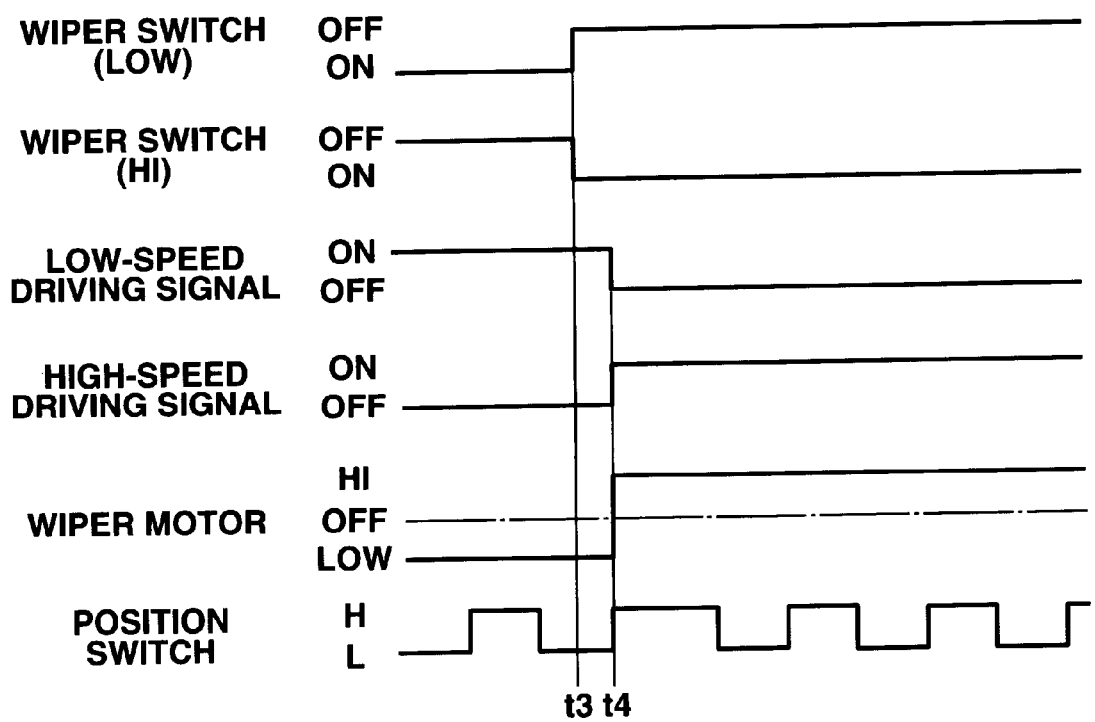
FIG. 6D is a time chart similarly illustrating the control at the time of switching operation from the low-speed mode into the high-speed mode.
Figure 9A:
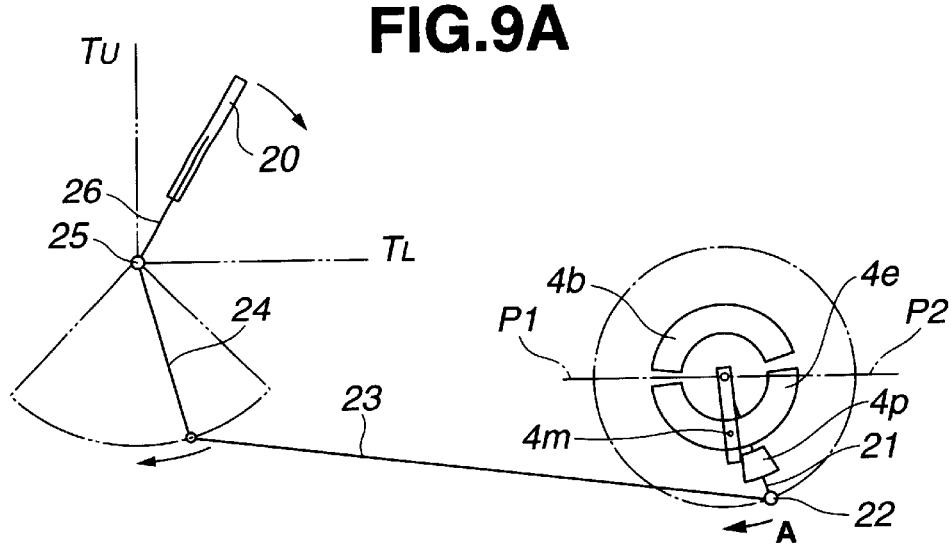
FIGS. 9A to FIG. 9D are explanatory drawings successively illustrating the positional relation between the wiper blade and the movable contact of the position switch in a case where the switching operation is carried out from the low-speed mode into the high-speed mode when the wiper blade is moving toward the lower turning position from the upper turning position.
Figure 9B:
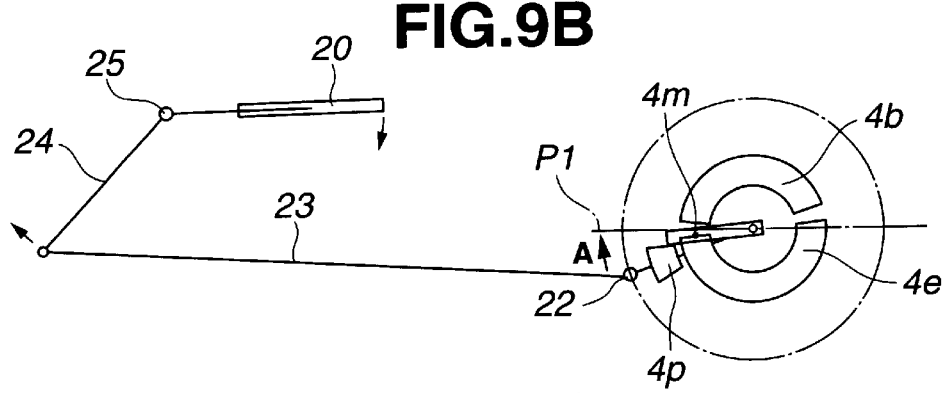
Figure 9C:
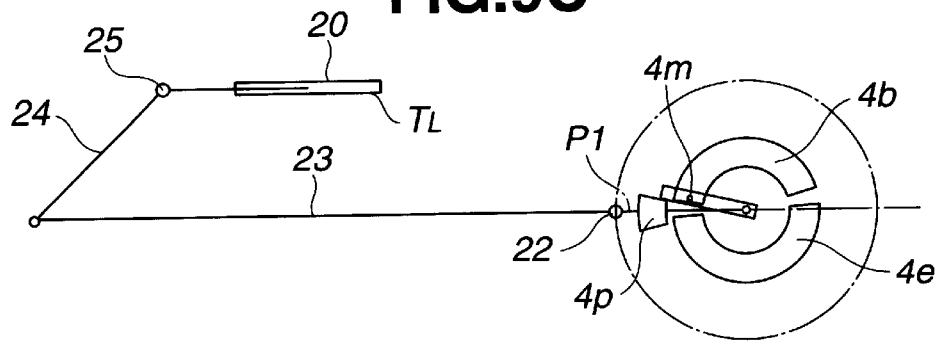
Figure 9D:
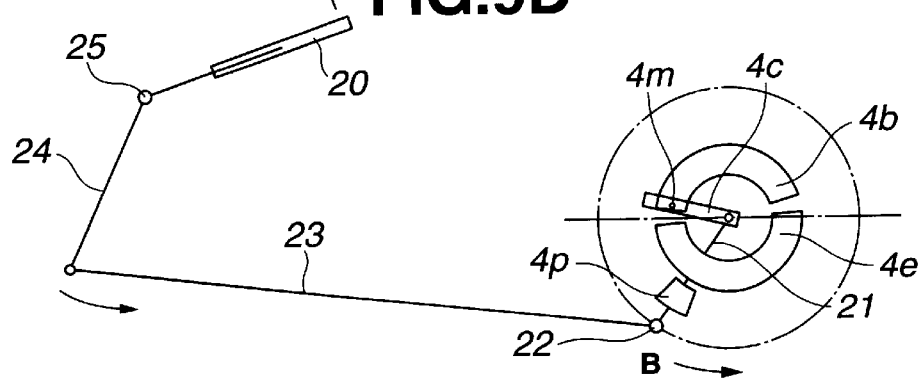

On the other side, in a case where the wiper switch 2 is switched over from the low-speed mode into the high-speed mode at time t3 shown in FIG. 6D, that is at the time when the wiper blade 20 is moving toward the lower turning position $T_L$ from the upper turning position $T_U$ as shown in FIG. 9A, the low-speed driving signal is switched over into the high-speed driving signal at time t4 when the movable contact 4m separates from the low-potential plate 4e of the position switch 4 as shown in FIG. 9B and the positive going edge (L→H) is caused in the position signal to be inputted in the position signal monitoring port P5 by the circuit 12, that is at the time when the wiper blade 20 arrives in the position predetermined just before the lower turning position $T_L$. However, the wiper motor 3 continues to rotate similarly in the forward direction (direction of arrow A) by inertia, and starts the high-speed reverse rotation at the time when the wiper blade 20 arrives at the lower turning position $T_L$ and the push member 4p of the position switch 4 reaches the point P1 as shown in FIG. 9C. In this time, the movable contact 4m is left behind on the high-potential plate 4b during nearly one revolution of the push member 4p.

Further, the eccentric bush 22 turns as much as 180° according to the reverse rotation of the wiper motor 3 and the substantial length of the motor arm 21 becomes shorter into "Lb" from "La" as mentioned above.

In this manner, the wiper motor 3 is so controlled as to be switched over from the low-speed forward direction into the high-speed reverse rotation at the time when the wiper blade 20 is in the lower turning position $T_L$ or the upper turning position $T_U$, accordingly it becomes possible to prevent the wiper blade 20 to return in the middle of the wiping range on the windshield glass at the time of switching operation of the wiper mode and actuate the wiper blade 20 very properly. Furthermore, the change of the wiper mode into the high-speed mode from the low-speed mode is carried out speedily because the wiper motor 3 is switched over into the high-speed reverse rotation at the same time when the wiper blade 20 first arrives in the turning position after switching over the wiper switch 2 from the low-speed mode into the high-speed mode.

(5) High-speed Operation

Figure 6E:
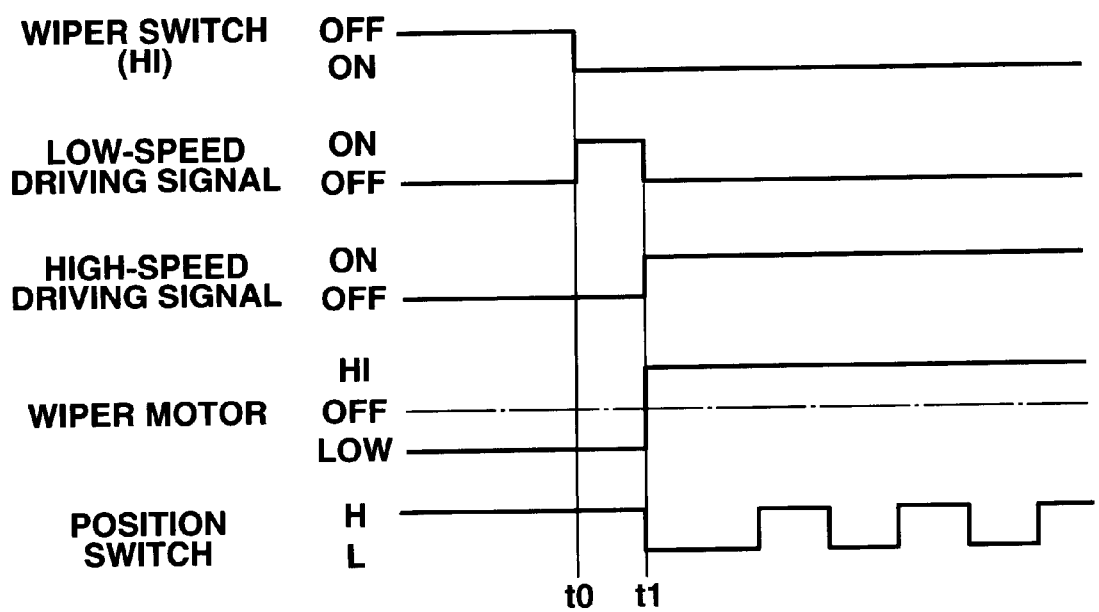
FIG. 6E is a time chart illustrating the control at the time of on-operation into the high-speed mode from the off-state.

When the wiper switch 2 is operated into the high-speed mode (HI) in the off-state of the wiper switch 2 at time t0 shown in FIG. 6E, the high-speed command signal input port P4 is grounded through the wiper switch 2, whereby it is decided that the high-speed switch is switched on (YES) at the step 108 of the flow chart shown in FIG. 4, the control proceeds to the step 122 from the step 108 and decision is done as to the high-speed operation flag $F_H$ at the step 122. Since the high-speed operation flag $F_H$ is cleared (NO) at the step 112 before the operation of the wiper switch 2 in this time, the control proceeds to the step 123 from the step122, and decision is done as to whether the low-speed operation flag $F_L$ is set or not at the step 123. Because the low-speed operation flag $F_L$ is also cleared (NO) at the step 113, the control proceeds to step 129 and further proceeds to the steps 118 and 119 after setting the low-seed operation flag $F_L$ at the step 129, and the low-speed driving signal is only output from the low-speed driving signal output port P6 at the step 119. Then, the control returns to the step 103.

According to the low-speed driving signal output from the low-speed driving signal output port P6 of the controller 10, the transistor TR2 becomes to the on-state and the fourth relay L4 is only changed on in the motor driving circuit 11, whereby the feeder circuit is formed to the wiper motor 3 in the low-speed forward-rotational direction as shown in FIG. 5B, the wiper motor 3 starts the forward rotation in the low speed and the wiper blade 20 also starts the wiping operation in the low-speed.

The control proceeds to the step 123 through the step 108 (YES) and the step 122 (NO) after returning to the step 103, further proceeds to the step 124 from the step 123 because the low-speed operation flag $F_L$ is set (YES) at the step 129 and decision is done at the step 124 as to whether signal change is caused or not in the position signal from the position switch 4. If the signal change is not caused (NO), the low-speed forward rotation of the wiper motor 3 is maintained at the steps 118 and 119, and the aforementioned processing is repeated until the signal change appears in the position signal to be supplied to the position signal monitoring port P5 from the position switch 4.

When the wiper blade 20 arrives in the predetermined position just before the upper turning position and the negative going edge (H→L) appears in the position signal to be inputted to the position signal monitoring port P5 according to the contact of the movable contact 4m with the low-potential plate 4e of the position switch 4 at time t1 shown in FIG. 6E, the control proceeds to the steps 125 and 126 from the step 124 (YES), and further proceeds to the steps 127 and 128 after setting the high-speed operation flag $F_H$ at the step 125 and clearing the low-speed operation flag $F_L$ at the step 126. The high-speed driving signal is generated from the high-speed driving signal output port P8 at the step 127 and the low-speed driving signal from the low-speed driving signal output port P6 is interrupted at the step 128.

According to the disappearance of the output signal from the low-speed driving signal output port P6 and the generation of the high-speed driving signal from the high-speed driving signal output port P8 of the controller 10, the transistors TR2 and TR1 become to the off-state and on-state respectively, whereby the fourth relay L4 is turned off, the first to the third relays L1, L2 and L3 are turned on. Accordingly, the feeder circuit is formed to the wiper motor 3 in the high-speed reverse-rotational direction as shown in FIG. 5D, the low-speed forward rotation of the wiper motor 3 is switched over to the high-speed reverse rotation, and the wiper blade 20 starts the wiping operation at the high speed. In this case, the relationship between the positions of the wiper blade 20 and the movable contact 4m of the position switch 4 is the same as shown in FIGS. 8A to 8D. Furthermore, the substantial length of the motor arm 21 becomes shorter into "Lb" from "La" according to the turn of the eccentric bush 22 along with the change of the rotational direction of the wiper motor 3 similarly as described above (see FIGS. 2A and 2B).

(6) Off-operation in High-speed Mode

Figure 6F:
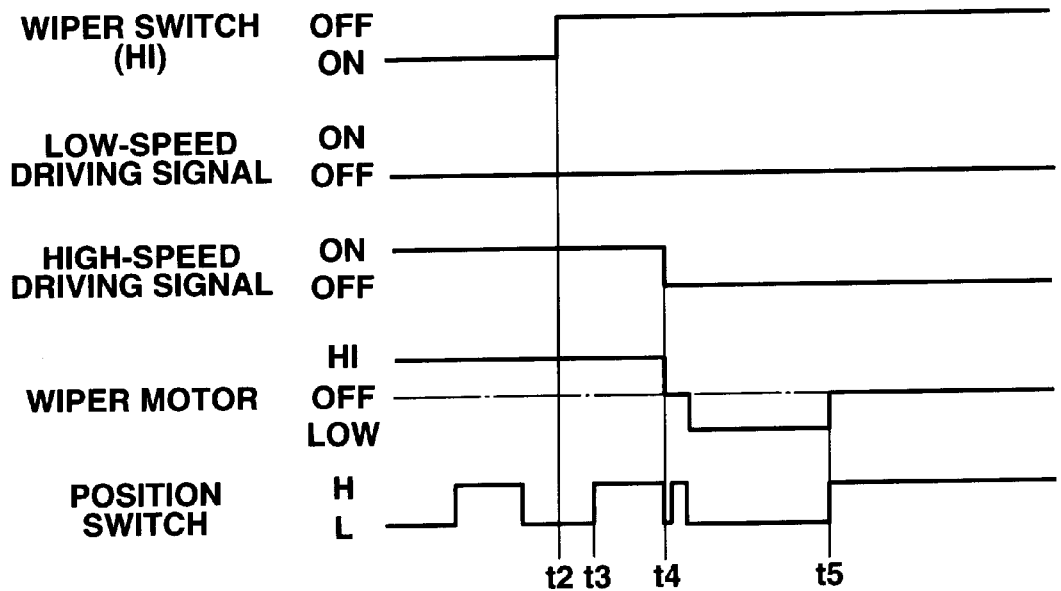
FIG. 6F is a time chart illustrating the control at the time of off-operation in the high-speed mode.
Figure 10A:
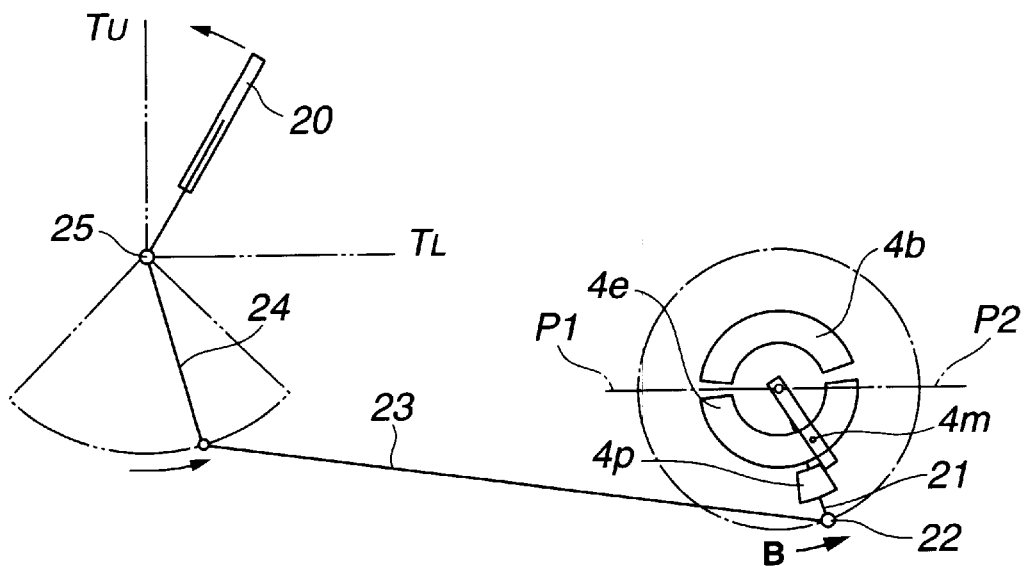
FIGS. 10A to FIG. 10G are explanatory drawings successively illustrating the positional relation between the wiper blade and the movable contact of the position switch in a case of off-operation in the high-speed mode.

When the wiper switch 2 is switched off at time t2 shown in FIG. 6F in the state where the wiper blade 20 is actuated in the high speed, the output shaft 3s of the wiper motor 3 is rotate reversely at the high speed together with the motor arm 21 and the push member 4p of the position switch in the direction of arrow B as shown in FIG. 10A, the high-speed command signal from the wiper switch 2 disappears (the high-speed command signal input port P4 is not grounded). Therefore, it is decided that the high-speed switch is not switched on (NO) at the step 108 of the flow chart shown in FIG. 4, and the low-speed switch is not switched on (NO) also at the step 109, the control proceeds to step 130 through the step 110 and decision is done as to whether the negative going edge (H→L) appears or not in the position signal to be supplied to the position signal monitoring port P5 at the step 130 because the high-speed operation flag $F_H$ is decided to be set (YES) at the step 110 (flag $F_H$ is already set at the step 125). If there is not such the signal change in the position signal (NO), the control proceeds to the steps 127 and 128 from the step 130 and the high-speed reverse rotation of the wiper motor 3 is held until the negative going edge is caused in the position signal.

Figure 10B:
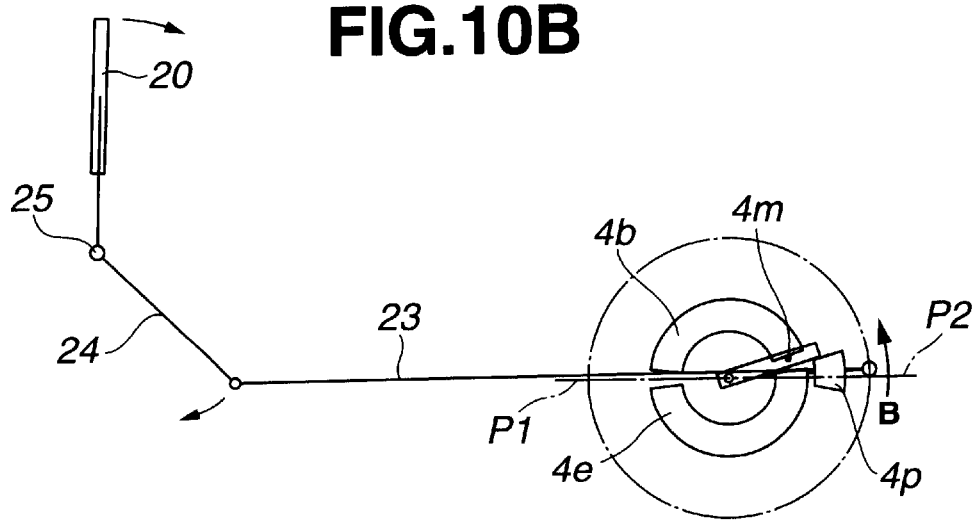
Figure 10C:
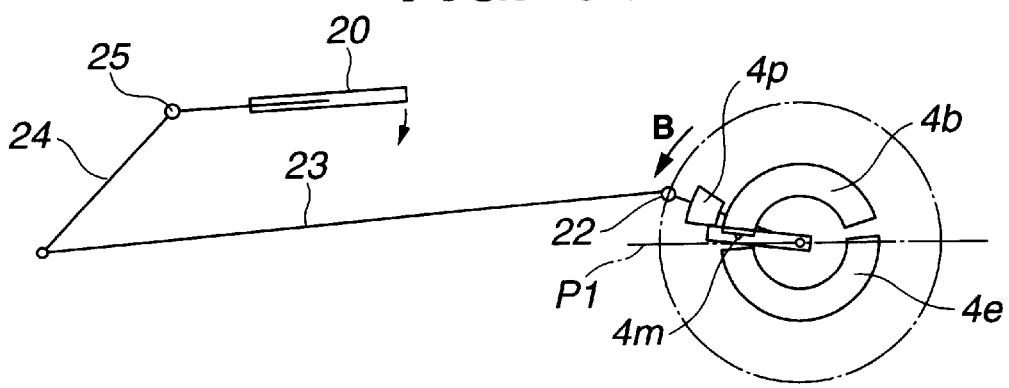

When the movable contact 4m touches the high-potential plate 4b of the position switch 4 at time t3 as shown in FIG. 10B, the positive going edge (L→H) is caused in the position signal at time t3 shown in FIG. 6F (the position signal is held in the low-level by the circuit 12 until the movable contact 4m comes in contact with the high-potential plate 4b even after the separating from the low-potential plate 4e), but the signal change of this kind is neglected. After this, when the wiper blade 20 arrives in the predetermined position just before the lower turning position $P_L$ and the movable contact 4m separates from the high-potential plate 4b of the position switch 4 at time t4, the position signal monitoring port P5 is grounded through the resistor R2, the diode D1 in the circuit 12 and the transistor TR1, so that the decision is done that the negative going edge (H→L) is caused in the position signal (YES) at the step 130, the control proceeds to the steps 114 and 115 after resetting the high-speed operation flag $F_H$ at step 131 and the output signal from the high-speed driving signal output port P8 is interrupted at the step 114.

Figure 10D:
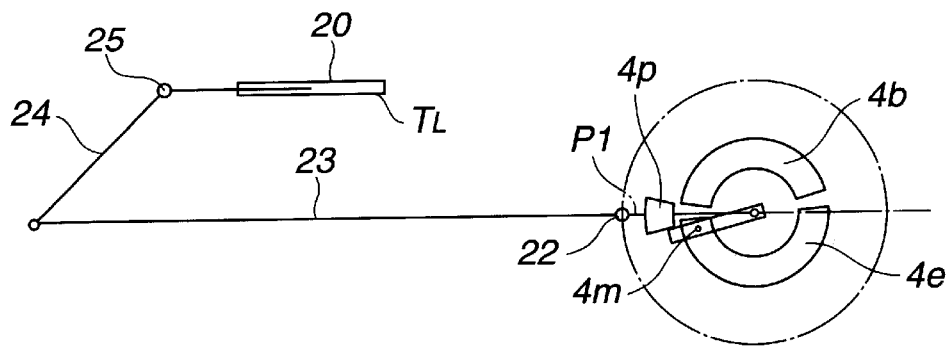
Figure 10E:
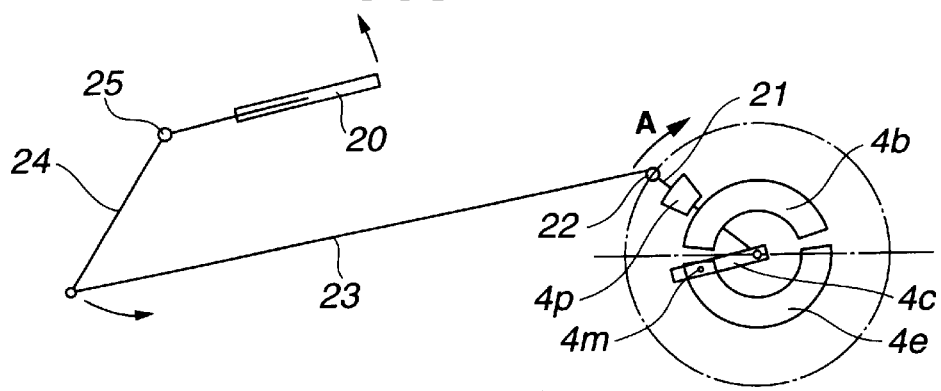

The transistor TR1 becomes to the off-state according to the interruption of the high-speed driving signal from the high-speed driving signal output port P8, whereby the coils L1s, L2s and L3s of the relays L1, L2 and L3 are unexcited and the feeder circuit for the wiper motor 3 is shut off. However the wiper motor 3 further continues to rotate by inertia and stops in the state where the wiper blade 20 arrives in the lower turning position $T_L$ and the movable contact 4m is in contact with the low-potential plate 4e of the position switch 4 as shown in FIG. 10D. In this time, the current supplying circuit for the wiper motor 3 is formed while the movable contact 4m is in contact with the low-potential plate 4e as shown in FIG. 5C, therefore the wiper motor 3 begins to rotate in the forward direction at the low speed as shown in FIG. 10E. The movable contact 4m is left behind on the low-potential plate 4e until the push member 4p comes in contact with the clutch member 4c from reverse side after about one revolution in the forward direction (direction of arrow A) and keeps on forming the current supplying circuit of the wiper motor 3 while the wiper blade 20 go and return one time.

According to the changeover of the rotational direction of the wiper motor 3, the eccentric bush 22 attached to the motor arm 21 turns by 180°, whereby the substantial length of the motor arm 21 is restored to "La" from "Lb" and the structural wiping range (static wiping range) returns to "Sa" as shown in FIG. 2A.

The position signal changes temporary in the high-level through the circuit 12 because the transistor TR1 becomes to the off-state owing to the interruption of the high-speed driving signal after the negative going edge is caused in the position signal at time t4 shown in FIG. 6F according as the movable contact 4m separates from the high-potential plate 4b (see FIG. 10C), however the position signal immediately changes into the low-level by the contact of the movable contact 4m with the low-potential plate 4e, and there is not effect on the control.

Figure 10F:
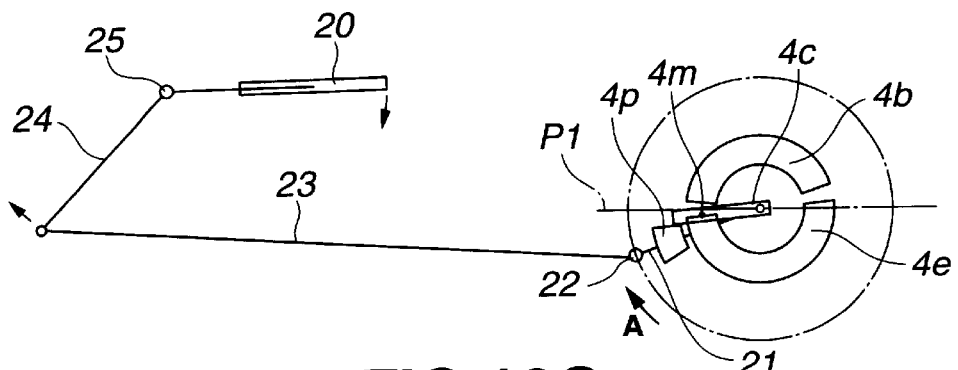
Figure 10G:
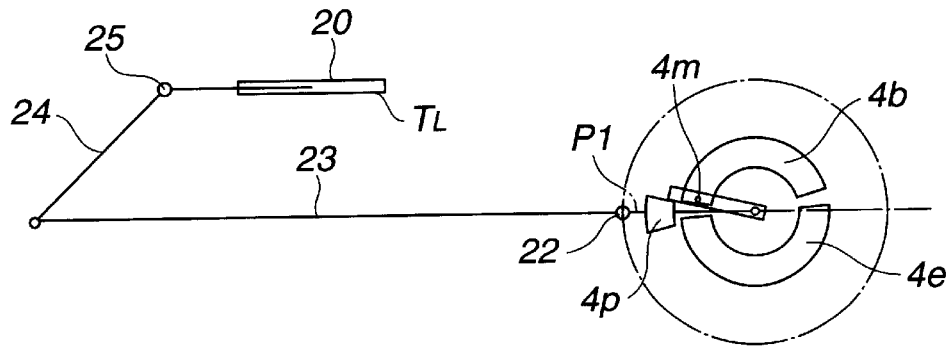

When the wiper blade 20 arrives in the predetermined position just before the lower turning position $T_L$ at time t5 shown in FIG. 6F and the movable contact 4m separates from the low-potential plate 4e as shown in FIG. 10F by the contact of the clutch member 4c with the push member 4p rotating forwardly in the direction of arrow A together with the output shaft 3s of the wiper motor 3 at the low speed, the current supplying circuit is shut off. The wiper motor 3 stops according to formation of the armature short circuit as shown in FIG. 5A at the time of contact of the movable contact 4m with the high-potential plate 4b after further rotation by inertia, thereby stopping the wiper blade 20 at the lower turning position $T_L$ (home position) as shown in FIG. 10G.

In such the manner, when the wiper switch 2 is switched off at the time of high-speed mode, the wiper apparatus is maintained in the high-speed mode until the wiper blade 20 arrives in the lower turning position and the automatic stopping operation through the current supplying circuit is started after the arrival of the wiper blade 20 in the lower turning position, therefore the control is simplified and it is possible to reduce the time required for stopping the wiper blade 20 at the lower turning position after off-operation of the wiper switch 2.

(7) Switching Operation to Low-speed Mode from High-speed Mode

Figure 6G:
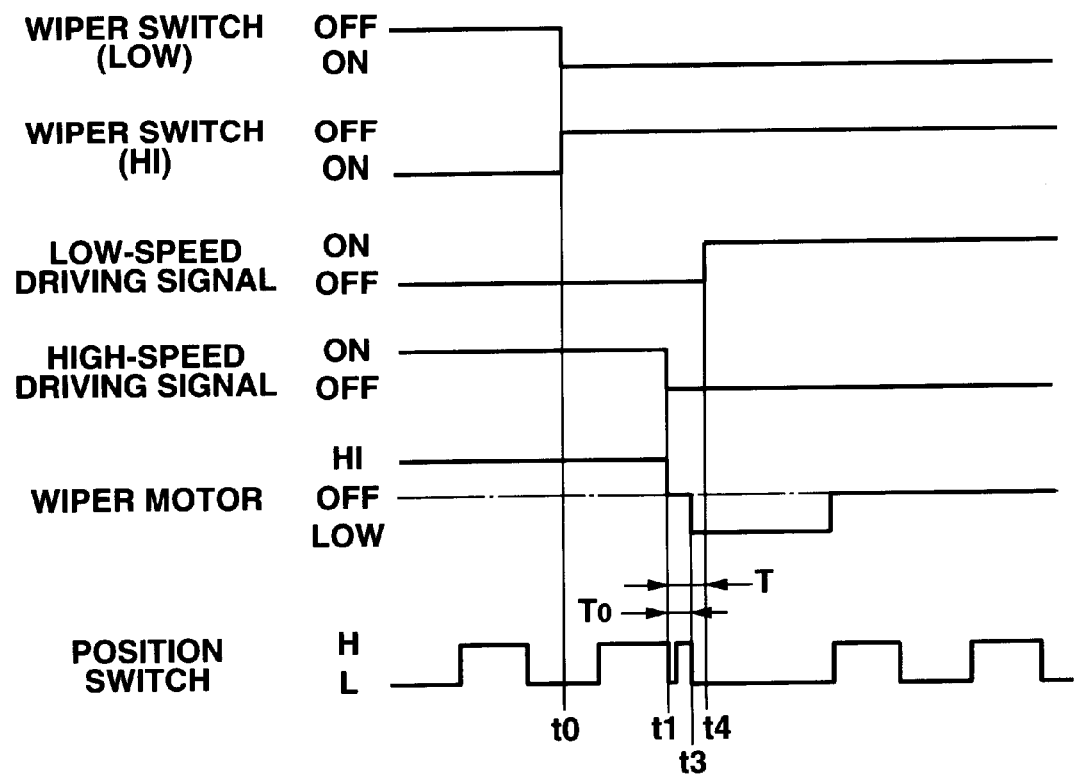
FIG. 6G is a time chart illustrating the control at the time of switching operation from the high-speed mode into the low-speed mode.

When the wiper switch 2 is switched form the high-speed mode (HI) to the low-speed mode (LOW) at time t1 shown in FIG. 6G in the state where the wiper blade 20 is actuated in the high speed, the low-speed command port P3 of the controller 10 is grounded through the wiper switch 2 at the same time of disappearance of the high-speed command signal from the wiper switch 2. Accordingly, decision is done that the high-speed switch is not switched on (NO) at the step 108 and the low-speed switch is switched on (YES) at the step 109, and the control proceeds to the step 117 through the step 116. At the step 117, decision is done as to the high-speed operation flag $F_H$ after setting the low-speed operation flag $F_L$ at the step 116.

Since the high-speed operation flag $F_H$ is already set in the step 125 at the time of high-speed mode before the switching operation, the control proceeds to step 132 from the step 117 (YES) and decision is done as to whether a delay flag $F_D$ is set or not at the step 132. Because the delay flag $F_D$ is reset (=0) at the step 101 in the initialization at the time of starting the control, the control proceeds to step 133 from the step 132 (NO) and decision is done at the step 133 as to whether or not there is the negative going edge (H→L) in the position signal from the position switch 4.

If the signal change of this kind does not appear (NO), the control proceeds to the steps 127 and 128, the high-speed driving signal is maintained from the high-speed driving signal output port P8 and the wiper motor 3 continues to rotate in the reverse direction at the high speed. Namely, the high-speed operation is kept on until the wiper blade 20 arrives in the predetermined position just before the lower turning position $T_L$ and the negative going edge is caused in the position signal supplied from the position switch 4 even after the arrival at the upper turning position $T_U$.

Subsequently, when the wiper blade 20 arrives in the predetermined position just before the lower turning position $T_L$ at time t2, the movable contact 4m separates from the high-potential plate 4b (see FIG. 10C) and the negative going edge (H→L) is caused in the position signal to be supplied to the position signal monitoring port P5, the control proceeds to step 134 from the step 133 (YES) and further proceeds to the steps 114 and 115 after setting the delay lag $F_D$ at the step 134. The high-speed driving signal from the high-speed driving signal output port P8 is interrupted at the step 114.

The transistor TR1 becomes to the off-state according to the disappearance of the high-speed driving signal from the high-speed driving signal output port P8, all of the relay are turned off, but the wiper motor 3 further rotates in the reverse direction by inertia.

During the inertial rotation of the wiper motor 3, the control returns to the step 103 and proceeds to the step 132 through the steps 104–108 (NO), the step 109 (YES), the steps 116 and 117 (YES), and decision is done at the step 132 as to the delay flag $F_D$. Since the delay flag $F_D$ is set at the step 134, the control proceeds to step 135 through the step 132 (YES), and decision is done as to whether count value of a delay counter D comes up to predetermined time "T" or not at the step 135. The time "T" is set sufficiently longer than time "To" required for the movable contact 4m of the position switch 4 to pass through the opening existing between high-potential plate 4b and low-potential plate 4e.

The control proceeds to step 136 from the step 135 (NO), increment of the delay counter D is carried out at the step 136 and the high and low-speed driving signals are kept in the interrupted states at the steps 114 and 115, thereby maintaining off-states of the respective relays until the count value of the delay counter D amounts to "T".

When the movable contact 4m comes in contact with the low-potential plate 4e of the position switch 4 at time t3 shown in FIG. 6G by the inertial rotation of the wiper motor 3, the wiper motor 3 is supplied with an electric current in the low-speed forward-rotational direction through the current supplying circuit formed as shown in FIG. 5C and starts the low-speed forward rotation through the current supplying circuit at the time when the wiper blade 20 arrives at the lower turning position after the further inertial rotation in the reverse direction.

When the count value of the delay counter D amounts to "T" at time t4 after starting the low-speed forward rotation through the current supplying circuit, the control proceeds to steps 137 and 138 from the step 135 (YES) and further proceeds to the steps 118 and 119 after clearing the delay counter D and the high-speed operation flag $F_H$ at the steps 137 and 138, respectively. The low-speed driving signal is generated from the low-speed driving signal output port P6 of the controller 10 at the step 119, thereby turning on the transistor TR2 and the fourth relay L4. Accordingly, the feeder circuit for the wiper motor 3 in the low-speed forward-rotational direction is formed as shown in FIG. 5B and the wiper blade 20 continues the wiping operation in the low speed.

In this time, the eccentric bush 22 of the motor arm 21 turns along with the changeover of the rotational direction of the wiper motor, whereby the substantial length of the motor arm 21 is restored to "La" as shown in FIG. 2A and the structural wiping range by the wiper blade 20 returns to "Sa" similarly as mentioned above.

In this manner, in the case of the changeover of the high-speed mode into the low-speed mode, the high-speed reverse rotation of the wiper motor 3 is changed into the low-speed forward rotation through the current supplying circuit after cutting off the power supply to the wiper motor 3 in the high-speed reverse-rotational direction through the motor driving circuit 11 at the time when the wiper blade 20 arrives in the predetermined position just before the lower turning position after the switching operation of the wiper switch 2, subsequently the wiper motor 3 is supplied with an electric current in the low-speed forward-rotational direction through the motor driving circuit 11 for the low speed operation. Accordingly, it is not necessary to shut off the large electric current caused by changing the rotational direction of the wiper motor 3 through the relays in the motor driving circuit 11, and it is possible to lighten the load of the relays and prevent troubles and further possible to miniaturize the relays and improve reliability of the relays.

As mentioned above, the wiper control device according to this invention is provided with the wiper switch, the wiper motor, the position switch, the controller, the motor driving circuit, and further provided with the regulating circuit and the backup circuit according to demand, and the controller changes the rotational direction of the wiper motor at the time the wiper blade arrives in the lower-turning position or the upper turning position in response to the switching operation of the wiper mode, for example. Therefore, it is possible to prevent unnatural phenomenon in that the wiper blade goes back from the middle on the windshield glass according as the rotational direction of the wiper motor is changed, and possible to prevent inconvenience such that rain drops and dust remain on the windshield glass unwiped by the backward movement of the wiper blade.

What is claimed is:

1. A wiper control device for controlling a wiper of a vehicle comprising:

a wiper switch operable for selectively generating a low-speed command signal or a high-speed command signal;

a wiper motor for actuating a wiper blade reciprocatively between lower and higher turning positions by low-speed forward rotation or high-speed reverse rotation;

a position switch for generating a position signal according to a position of the wiper blade;

a controller for generating a low-speed driving signal in response to the low-speed command signal generated from said wiper switch and the position signal generated from said position switch, and a high-speed driving signal in response to the high-speed command signal generated from said wiper switch and the position signal generated from said position switch; and a motor driving circuit provided with a plurality of switching means for supplying an electric current to the wiper motor in a low-speed forward-rotational direction in response to the low-speed driving signal generated from said controller, and supplying an electric current to the wiper motor in a high-speed reverse-rotational direction in response to the high-speed driving signal generated form said controller; wherein said controller executes control to change the rotational direction of said wiper motor at the time when the wiper blade arrives in the lower turning position or the upper turning position after the low-speed command signal or the high-speed command signal generated from said wiper switch is switched over into the high-speed command signal or the low-speed command signal, respectively.

2. A wiper control device as set forth in claim 1, wherein said position switch is provided with an arch-shaped high-potential plate connected with a power source and disposed on one side of circumference of a circle, a similarly arch-shaped low-potential plate grounded and disposed on another side of said circumference of the circle isolatedly from said high-potential plate, a push member to be rotated together with an output shaft of said wiper motor, a clutch member disposed coaxially with said high and low-potential plates so as to be rotatable together with said push member by being pushed against the push member, and a movable contact connected to said controller and said motor driving circuit and attached to said clutch member so as to be in sliding contact with said high and low-potential plates.

3. A wiper control device as set forth in claim 2, wherein said motor driving circuit forms a current supplying circuit for supplying an electric current to the wiper motor in the low-speed forward-rotational direction through the movable contact and the low-potential plate of the position switch in a state where neither the low-speed driving signal nor the high-speed driving signal is not generated from the controller.

4. A wiper control device as set forth in claim 3, wherein said position switch is set so as to produce a change in the position signal at the time when the wiper blade arrives at a position predetermined in just before the lower turning position.

5. A wiper control device as set forth in claim 4, wherein said position switch is set so as to produce a change in the position signal at the time when the wiper blade arrives in a position predetermined in just before the upper turning position in a case where the wiper motor is rotated forwardly in the low speed.

6. A wiper control device a set forth in claim 5, wherein said control device is provided with a circuit for supplying the position signal on low level to the controller when the controller outputs the high-speed driving signal and supplying the position signal on high level to the controller if the controller does not output the high-speed driving signal, in a case where the movable contact is in an opening formed between the high and low-potential plates of said position switch.

7. A wiper control device as set forth in claim 6, wherein said controller executes control to interrupt the output of the high-speed driving signal at the time when the wiper blade arrives at a position predetermined in just before the lower turning position after disappearance of the high-speed command signal from the wiper switch.

8. A wiper control device as set forth in claim 6, wherein, said controller executes control to switch over the low-speed driving signal into the high-speed driving signal at the time when the wiper blade arrives at a position predetermined in just before the lower turning position or the higher turning position after the low-speed command signal from the wiper switch is switched over into the high-speed command signal, and executes control to interrupt the output of the high-speed driving signal at the time when the wiper blade arrives at the position predetermined in just before the lower turning position after the high-speed command signal from the wiper switch is switched over into the low-speed command signal and to generate the low-speed driving signal at the time when a period of time predetermined sufficiently longer than time required for the movable contact to pass the opening formed between the high and low-potential plates of the position switch elapses after said arrival of the wiper blade at the position predetermined in just before the lower turning position.

9. A wiper control device as set forth in claim 7, wherein said controller executes control to switch over the low-speed driving signal into the high-speed driving signal at the time when the wiper blade arrives at a position predetermined in just before the lower turning position or the higher turning position after the low-speed command signal from the wiper switch is switched over into the high-speed command signal, and executes control to interrupt the output of the high-speed driving signal at the time when the wiper blade arrives at the position predetermined in just before the lower turning position after the high-speed command signal from the wiper switch is switched over into the low-speed command signal and to generate the low-speed driving signal at the time when a period of time predetermined sufficiently longer than time required for the movable contact to pass the opening formed between the high and low-potential plates of the position switch elapses after said arrival of the wiper blade at the position predetermined in just before the lower turning position.

10. A wiper control device as set forth in claim 1, wherein said control device is provided with a backup circuit for supplying an electric current to the wiper motor in the low-speed forward-rotational direction or the high-speed reverse-rotational direction through said motor driving circuit when the wiper switch is operated in a state of disappearance of a watch dog signal to be generated from the controller.

11. A wiper control device as set forth in claim 2, wherein said wiper motor is provided with a first terminal connected to a common brush, a second terminal connected to a low brush disposed in an opposed position against said common brush and a third terminal connected to a high brush disposed in a position near to the low brush between said common brush and said low brush;

said motor driving circuit is provided with four relays, a first transistor of which emitter is grounded and base is connected to a high-speed driving signal output port of said controller, and a second transistor of which emitter is grounded and base is connected to a low-speed driving signal output port of said controller; ends of respective relay coils of said four relays are connected with the power source, the other ends of the respective relay coils of the first, second and third relays among said four relays are connected to collector of the first transistor, another end of the relay coil of the fourth relay of said four relays is connected to collector of the second transistor; a moving contact and a normal-closed contact of the first relay are connected to the power source and the second terminal of said wiper motor, respectively; a moving contact of the second relay is grounded and a normal-closed contact of said second relay is connected to the third terminal of said wiper motor; a moving contact, a normal-opened contact and a normal-closed contact of the third relay are connected to the first terminal of said wiper motor, the power source and a moving contact of the fourth relay, respectively; and a normal-closed contact of the fourth relay is connected to the movable contact of the position switch and a normal-opened contact of said fourth relay is grounded.

12. A wiper control device as set forth in claim 11, wherein said control device is further provided with a circuit including two resistors connected in series with each other of which one end is connected to the power source and another end is connected in the middle of a connection wire between the movable contact of the position switch and a position signal monitoring port of the controller, and a diode connected between a node of said two resistors and the collector of said first transistor for permitting an electric current to pass through toward the first transistor.

13. A wiper control device as set forth in claim 11, wherein said control device is further provided with a backup circuit including a first and a second capacitor, a third and a fourth transistor, a second diode connected between said third and fourth transistors, and a third diode connected between said fourth transistor and a terminal of said wiper switch to be grounded by operating the wiper switch into a high-speed mode for permitting an electric current to pass through toward the wiper switch; emitter of said third transistor is grounded, collector and base of the third transistor are connected to the power source and a watchdog signal output port of the controller through the first capacitor, respectively; collector and base of the fourth transistor are connected to the other end of the relay coil of said fourth relay in the motor driving circuit and cathode of the second diode, respectively; and anode of said second diode is connected to collector of the third transistor and grounded through the second capacitor.

14. A wiper control device as set forth in claim 12, wherein said control device is further provided with a backup circuit including a first and a second capacitor, a third and a fourth transistor, a second diode connected between said third and fourth transistors, and a third diode connected between said fourth transistor and a terminal of said wiper switch to be grounded by operating the wiper switch into a high-speed mode for permitting an electric current to pass through toward the wiper switch; emitter of said third transistor is grounded, collector and base of the third transistor are connected to the power source and a watchdog signal output port of the controller through the first capacitor, respectively; collector and base of the fourth transistor are connected to the other end of the relay coil of said fourth relay in the motor driving circuit and cathode of the second diode, respectively; and anode of said second diode is connected to collector of the third transistor and grounded through the second capacitor.

* * * * *